(12) United States Patent
Marsolek

(10) Patent No.: US 11,275,364 B2
(45) Date of Patent: *Mar. 15, 2022

(54) TRUCK PROCESS MANAGEMENT TOOL FOR TRANSPORT OPERATIONS

(71) Applicant: CATERPILLAR PAVING PRODUCTS INC., Brooklyn Park, MN (US)

(72) Inventor: John Lee Marsolek, Watertown, MN (US)

(73) Assignee: Carterpillar Paving Products Inc., Brooklyn Park, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/806,940

(22) Filed: Mar. 2, 2020

(65) Prior Publication Data

US 2020/0201307 A1 Jun. 25, 2020

Related U.S. Application Data

(63) Continuation of application No. 15/381,094, filed on Dec. 15, 2016, now Pat. No. 10,613,524, which is a
(Continued)

(51) Int. Cl.
*G05B 19/41* (2006.01)
*G05B 19/418* (2006.01)
(Continued)

(52) U.S. Cl.
CPC ..... *G05B 19/41895* (2013.01); *G06F 3/0481* (2013.01); *G06F 3/04847* (2013.01);
(Continued)

(58) Field of Classification Search
CPC .... G05B 19/41895; G05B 2219/45052; G06Q 10/08; G07C 5/0841; G07C 5/0825; G06F 3/0481; G06F 3/04847
See application file for complete search history.

(56) References Cited

U.S. PATENT DOCUMENTS 5,646,844 A 7/1997 Clark
6,460,008 B1 10/2002 Hardt
(Continued)

FOREIGN PATENT DOCUMENTS

CN 201060408 6/2007
CN 102409592 4/2012
(Continued)

OTHER PUBLICATIONS

Mike Hasslbauer; "Trimble CCSFlex and GCS900/AccuGrade Compaction Control System for Soil and Asphalt Compactors", article, retrieved from the internet as early as Dec. 15, 2016, 13 pages.
(Continued)

*Primary Examiner* — Keith D Bloomquist
(74) *Attorney, Agent, or Firm* — Xsensus LLC

(57) ABSTRACT

A process management tool for managing transport of a material between a first location and a second location is disclosed. The process management tool includes a communication device configured to receive data messages, a display device, an input device configured to receive user inputs, and a processor in communication with the communication device, the display device, and the input device. The processor is configured to generate a graphical user interface on the display device. The graphical user interface includes a map indicative of a position of each of one or more transport vehicles with respect to the first location and the second location. The graphical user interface further includes a first graphical object indicative of a spacing between a first transport vehicle and a second transport vehicle of the one or more transport vehicles and a second graphical object indicative of a process parameter associated with the material.

20 Claims, 10 Drawing Sheets

Related U.S. Application Data continuation-in-part of application No. 14/997,243, filed on Jan. 15, 2016, now Pat. No. 10,474,338.

(51) Int. Cl.
- *G07C 5/08* (2006.01)
- *G06F 3/0481* (2022.01)
- *G06F 3/04847* (2022.01)
- *G06Q 10/08* (2012.01)

(52) U.S. Cl.
CPC ........... *G06Q 10/08* (2013.01); *G07C 5/0825* (2013.01); *G07C 5/0841* (2013.01); *G05B 2219/45052* (2013.01)

(56) References Cited

U.S. PATENT DOCUMENTS

| | | |
|---|---|---|
| 6,749,364 B1 | 6/2004 | Baker et al. |
| 8,099,218 B2 | 1/2012 | Glee et al. |
| 8,306,836 B2 | 11/2012 | Nichols et al. |
| 8,356,957 B2 | 1/2013 | Weiser |
| 8,924,152 B2 | 12/2014 | Hunt et al. |
| 8,930,092 B2 | 1/2015 | Minich |
| 9,011,038 B2 | 4/2015 | Bushmann et al. |
| 2002/0059320 A1 | 5/2002 | Tamaru |
| 2002/0196151 A1 | 12/2002 | Troxier |
| 2005/0171692 A1 | 8/2005 | Hamblen |
| 2007/0142059 A1 | 6/2007 | Wang |
| 2007/0239338 A1 | 10/2007 | Potts et al. |
| 2008/0084332 A1 | 4/2008 | Ritter et al. |
| 2012/0066019 A1 | 3/2012 | Hinshaw et al. |
| 2012/0185168 A1 | 7/2012 | Patel |
| 2012/0221379 A1 | 8/2012 | Martinez et al. |
| 2012/0263530 A1* | 10/2012 | Buschmann ............ E01C 19/00 404/72 |
| 2012/0288328 A1 | 11/2012 | Minich |
| 2013/0198088 A1 | 8/2013 | Mewes et al. |
| 2013/0268890 A1 | 10/2013 | Jensen et al. |
| 2013/0290062 A1 | 10/2013 | Patel et al. |
| 2015/0275482 A1 | 10/2015 | Hill et al. |
| 2016/0117372 A1 | 4/2016 | Krafft |
| 2017/0083844 A1* | 3/2017 | Baker .............. G06Q 10/06313 |
| 2017/0205999 A1 | 7/2017 | Marsolek |
| 2017/0228108 A1 | 8/2017 | Marsolek |

FOREIGN PATENT DOCUMENTS

| | | |
|---|---|---|
| CN | 202595600 | 5/2012 |
| CN | 103290760 | 6/2013 |
| CN | 103321129 | 6/2013 |
| CN | 103866673 | 6/2014 |
| CN | 106019339 | 5/2016 |
| KR | 101035091 | 5/2011 |
| WO | WO 2013040769 | 3/2013 |

OTHER PUBLICATIONS

Weihan Zhang et al., The Control System Research of Paving Machine for the modified asphalt coiled material, Aug. 2011, IEEE, pp. 2433-2437 (Year: 2011).

Yin Qin et al., Research on automatic control of paver leveling system based on DSP host controller, 2010, IEEE, pp. 321-324 (Year: 2010).

* cited by examiner

TRUCK PROCESS MANAGEMENT TOOL FOR TRANSPORT OPERATIONS

RELATED APPLICATIONS

This application is a continuation of U.S. application Ser. No. 15/381,094, filed Dec. 15, 2016, which is a continuation-in-part application of U.S. application Ser. No. 14/997,243, filed Jan. 15, 2016, the contents of each of which are expressly incorporated herein by reference.

TECHNICAL FIELD

The present disclosure relates generally to a process management tool and, more particularly, to a truck process management tool for transport operations.

BACKGROUND

Paved roadways that are built to facilitate vehicular travel are typically resurfaced from time to time as wear and tear caused by several factors, such as fatigue and freeze-thaw cycles, degrades the surface of the roadway. Many paved roadways consist of an asphalt surface course that is supported by a base course comprising one or more layers of aggregate material deposited on a subgrade of native earth material. After the base course is prepared during a road building operation or after the old surface course is removed during a resurfacing operation, fresh asphalt for the new surface course is laid down using a paving machine and compacted to form a strong, smooth road surface. In many cases, fresh asphalt is produced at a plant and delivered to the worksite in haul trucks while the asphalt is still at a high enough temperature to be effectively laid down and compacted. To ensure the paving process is able to run continuously and efficiently, a continuous and steady flow of fresh asphalt must be delivered to the paver. Thus, there are often several haul trucks participating in the asphalt transport process—while some trucks are picking up fresh material, others are already in transit to the paver with fresh material, while others are emptying their payload or have already done so and are returning to the plant.

In many cases, a foreman or other operations manager is responsible for overseeing material transport operations to ensure the paving process runs smoothly. This task includes managing the flow of fresh material between the plant and the worksite to ensure fresh asphalt is constantly available to the paver, while preventing an over-accumulation of asphalt at the jobsite. When the paver is starved of fresh asphalt, the paving process must be paused, which can cause a chain of events that reduce the efficiency of operations. For example, when the paver stops, compacting operations behind the paver must stop, and road milling operations ahead of the paver may be required to stop (e.g., to avoid milling more road surface than can be repaved in the remaining work time). Idle time reduces efficiency and is often avoided where possible. On the other hand, when too much fresh asphalt accumulates at the worksite, a queue of haul trucks may develop, which can create inconveniences at the worksite and reduce the overall efficiency of the operation (i.e., resulting in idle trucks waiting to dump their payload). Additionally, the hot asphalt in each truck constantly cools over time, and if trucks are required to wait in line too long before dumping their payload (i.e., before the asphalt is used in the paving process), the asphalt can cool below an acceptable usable temperature and may have to be discarded, which is wasteful and costly.

A system for controlling paving process operations is disclosed in U.S. Pat. No. 8,930,092 that issued to Minich on Jan. 6, 2015 ("the '092 patent"). In particular, the '092 patent discloses a system for monitoring and controlling paving operation that incorporates an integrated trucking logistics process, an integrated yield process, and an integrated quality control process. The integrated trucking logistics process involves identifying when trucks encounter "witness points" along the delivery and return paths between a plant and a worksite to facilitate estimating the arrival time of the truck at the worksite in conjunction with a commercial traffic monitoring system. When a truck delivers material to a paver, the material delivered is associated with that truck, and the truck is "released" from the paver. The empty truck is added to an inbound manifest of the plant, and an estimated time of arrival of the truck at the plant is determined. This information is used to control paving speed, plant production rate, and shipping rates.

While the system of the '092 patent may allow for arrival times of trucks to be estimated at the worksite and the plant, it may not be optimum. In particular, the system of the '092 patent may be limited to observing trucking operations for purposes of controlling paver and plant operations. Further, the system of the '092 patent may ultimately rely on the foremen to observe trucking operations and to communicate those observations, which can be a burden on the foreman.

The truck process management tool of the present disclosure solves one or more of the problems set forth above and/or other problems in the art.

SUMMARY

In one aspect, the present disclosure is related to a process management tool for managing transport of a material between a first location and a second location. The process management tool includes a communication device configured to receive data messages, a display device, an input device configured to receive user inputs, and a processor in communication with the communication device, the display device, and the input device. The processor is configured to generate a graphical user interface on the display device. The graphical user interface includes a map indicative of a position of each of one or more transport vehicles with respect to the first location and the second location. The graphical user interface further includes a first graphical object indicative of a spacing between a first transport vehicle and a second transport vehicle of the one or more transport vehicles and a second graphical object indicative of a process parameter associated with the material.

In another aspect, the present disclosure is related to a method of providing a process management tool having a display device for managing transport of a material between a first location and a second location. The method includes generating a graphical user interface on the display device and displaying a map on the graphical user interface, the map being indicative of a position of each of one or more transport vehicles with respect to the first location and the second location. The method further includes displaying a first graphical object on the graphical user interface, the first graphical object being indicative of a spacing between a first transport vehicle and a second transport vehicle of the one or more transport vehicles. The method further includes displaying a second graphical object on the graphical user interface, the second graphical object being indicative of a process parameter associated with the material.

In yet another aspect, the present disclosure is directed to a process management tool for managing transport of a material between a first location and a second location. The process management tool includes a communication device configured to receive data messages, a display device, an input device configured to receive user inputs, and a processor in communication with the communication device, the display device, and the input device. The processor is configured to generate a graphical user interface on the display device. The graphical user interface includes a map indicative of a position of each of one or more transport vehicles with respect to the first location and the second location. The graphical user interface further includes a first graphical object indicative of a spacing between a first transport vehicle and a second transport vehicle as a time or a distance, a second graphical object indicative of a process parameter indicative of one of a material production rate and a material consumption rate, and a third graphical object indicative of an operating parameter of the first or second transport vehicle.

DETAILED DESCRIPTION

For the purpose of this disclosure, the term "asphalt" is defined as a mixture of aggregate and asphalt cement. Asphalt cement is a brownish-black solid or semi-solid mixture of bitumens obtained as a byproduct of petroleum distillation. The asphalt cement can be heated and mixed with the aggregate for use in paving roadway surfaces, where the mixture hardens upon cooling.

Figure 1:
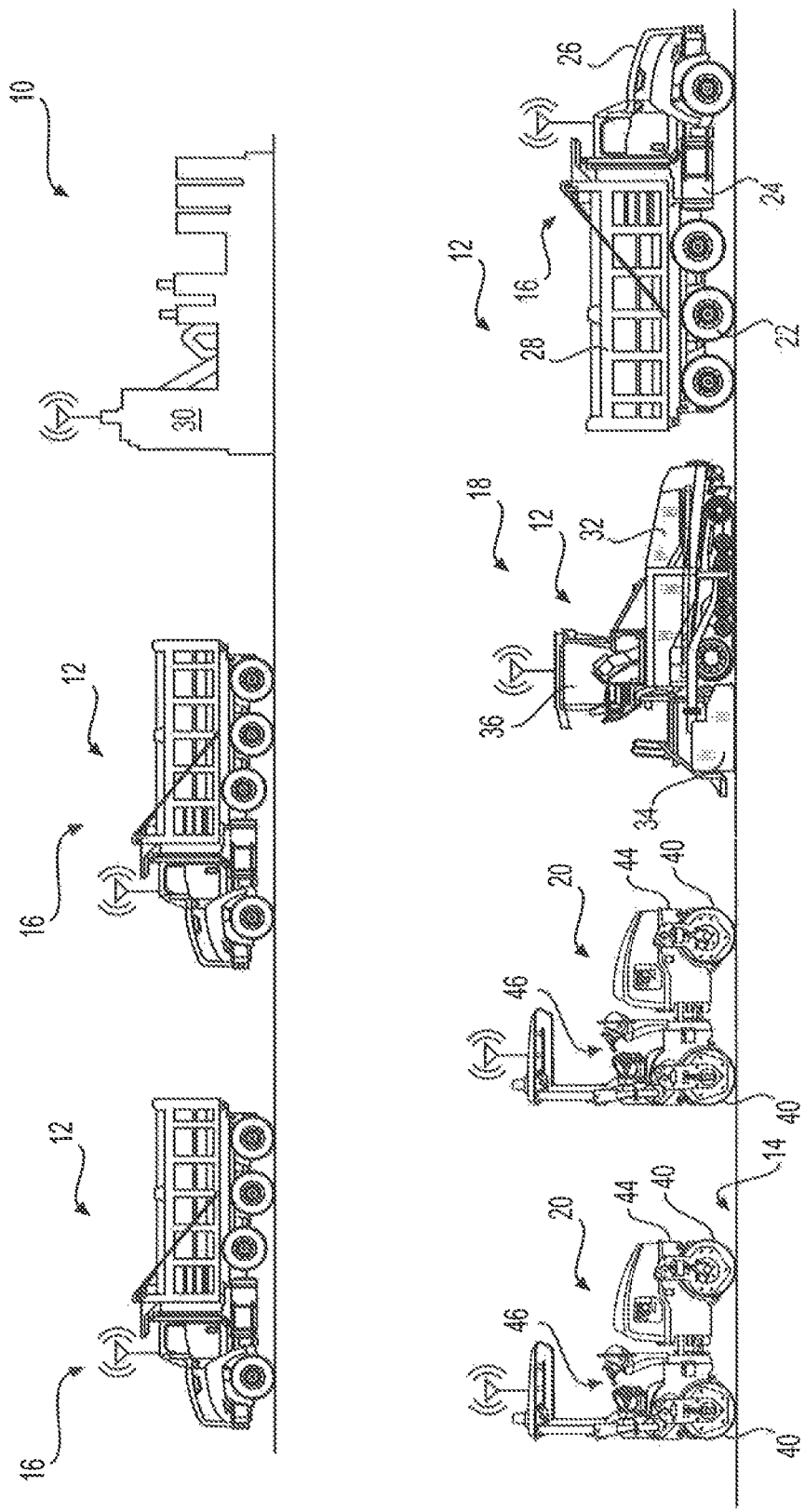
FIG. 1 is a pictorial illustration of an exemplary worksite of a road surfacing operation having a plurality of machines.

FIG. 1 shows an exemplary worksite 10 where a plurality of machines 12 are employed to perform a road surfacing operation, such as laying down an asphalt layer onto a work surface 14. The surfacing operation involves completing a plurality of different tasks according to a planned design model of the finished road. Each machine 12 may be used to perform one or more of the plurality of tasks based on the types of operations that each respective machine 12 is configured to perform. That is, each machine 12 is particularly configured to perform certain tasks that other machines may not be configured to perform. In this way, each machine 12 is associated with one of the plurality of tasks.

For example, machines 12 include one or more (i.e., at least one) haul trucks 16, paving machines ("paver") 18 (only one shown), and compacting machines ("compactors") 20. It is understood that other types of machines may be used. Each haul truck 16 is a mobile machine supported on a plurality of wheels 22 connected to a frame 24. Wheels 22 are operably connected to and driven by an engine 26 via a plurality of drivetrain components (e.g., a flywheel or a torque converter, a transmission, a driveshaft, a differential, an axle, etc.). Each haul truck 16 includes a bed 28 attached to frame 24 for carrying an amount of material, such as paving material (e.g., asphalt), from a first location, such as an asphalt production plant ("plant") 30, to a second location, such as worksite 10. Bed 28 includes an open top side for receiving material and an enclosed rear side having a hinged tailgate for dumping material. The rear side of bed 28 is connected to frame 24 via a hinging mechanism, and a lifting actuator (e.g., a hydraulic cylinder) is attached to a front side of bed 28, thereby allowing the front side of bed 28 to be tipped upward for dumping material.

Paver 18 may be a wheeled or tracked machine equipped with a hopper 32 at a front side of paver 18 for storing paving material to be deposited onto work surface 14. Material from hopper 32 is moved via a conveyor system to a rear side of paver 18 where the material is deposited onto work surface 14. Hopper 32 includes an open top side configured to receive additional material from haul truck 16 to replace deposited material. The material is distributed across at least a portion of a width of paver 18 by an auger or other distribution device.

A screed 34 is connected to the rear end of paver 18, and paver 18 pulls screed 34 over the freshly deposited material to create a mat of paving material having a desired thickness on top of work surface 14. Screed 34 includes one or more screed plates that smooth out the fresh paving material. The screed plates are adjustable via one or more associated actuators for changing the height, width, and/or slope of the screed plates. In some embodiments, one or more of the screed plates are connectable to an end of another screed plate by fasteners or another type of connection. Operating parameters, such as a groundspeed of paver 18 and the height, width, and slope of screed 34 can be controlled from an operator station 36 using a plurality of control devices 38 (shown only in FIG. 2).

Compactors 20 are equipped with compacting tools 40 configured to compact the material beneath them. As shown in FIG. 1, compactor 20 is supported on the work surface 14 by compacting tools 40 and propelled via a hydraulic system operatively connected to and driven by a power source (e.g., an engine). Compacting tool 40 is rotationally connected to a frame 44. In this way, compactor 20 can be driven forward on compacting tools 40. Operating parameters, such as a groundspeed, a travel direction, and/or other parameters, can be controlled from an operator station 46 using a plurality of control devices 48. In some embodiments, compacting tool 40 is a drum having a smooth outer surface configured to engage and compact work surface 14. The drum may include an internal vibratory system comprising one or more eccentric weights driven by motors for vibrating compacting tool 40 at a certain frequency and amplitude to cause greater compaction of the material beneath compacting tool 40. The frequency and amplitude of the vibratory system, along with other operating parameters, such as a groundspeed and travel direction of compactor 20, can be controlled from operator station 46 using at least one of the plurality of control devices 48.

Plant 30 is configured to produce asphalt for use at worksite 10. The asphalt produced at plant 30 may comply with certain specifications, such as aggregate size (e.g., fine grade, course grade, etc.), aggregate material type (e.g., granite, river gravel, sandstone, etc.), aggregate shape (e.g., round, angular, etc.), percent of asphalt cement, production temperature, etc. Plant 30 produces asphalt at a certain production rate, such as an amount of asphalt (e.g., tons) per hour, and in accordance with a production plan, which may include goals and/or limitations on amounts of asphalt produced over a period of time (e.g., per day) or for use on a particular jobsite (e.g., worksite 10). Although only one plant 30 is shown in FIG. 1, plant 30 may be one of a plurality of plants that produce asphalt for use on worksite 10. As used herein, the phrase "production rate" refers to an amount of material (e.g., a weight, a mass, a volume, a two-dimensional area, etc.) per unit time, such as a mass flow rate, a volume flow rate, an amount per unit area, amount per unit length, etc.

Asphalt produced at plant 30 has an initial temperature immediately following production that is relatively high and decreases over time. Generally, haul trucks 16 transport hot asphalt from plant 30 to worksite 10 so that when the asphalt is loaded into paver 18, the temperature of the asphalt is still high enough to be properly deposited and compacted. When the paving operation on worksite 10 is delayed for any reason, haul trucks 16 can be delayed from unloading their fresh asphalt, which can lead to the fresh asphalt being significantly reduced in temperature. This can reduce the amount of time available for paver 18 to deposit the asphalt and for compactors 20 to compact the deposited asphalt before it becomes too cool and unworkable. Further, delays in the paving process can create situations in which haul trucks 16, paver 18, and/or compactors 20 sit idly until the paving process resumes, which can reduce the overall efficiency of the surfacing operation.

Figure 2:
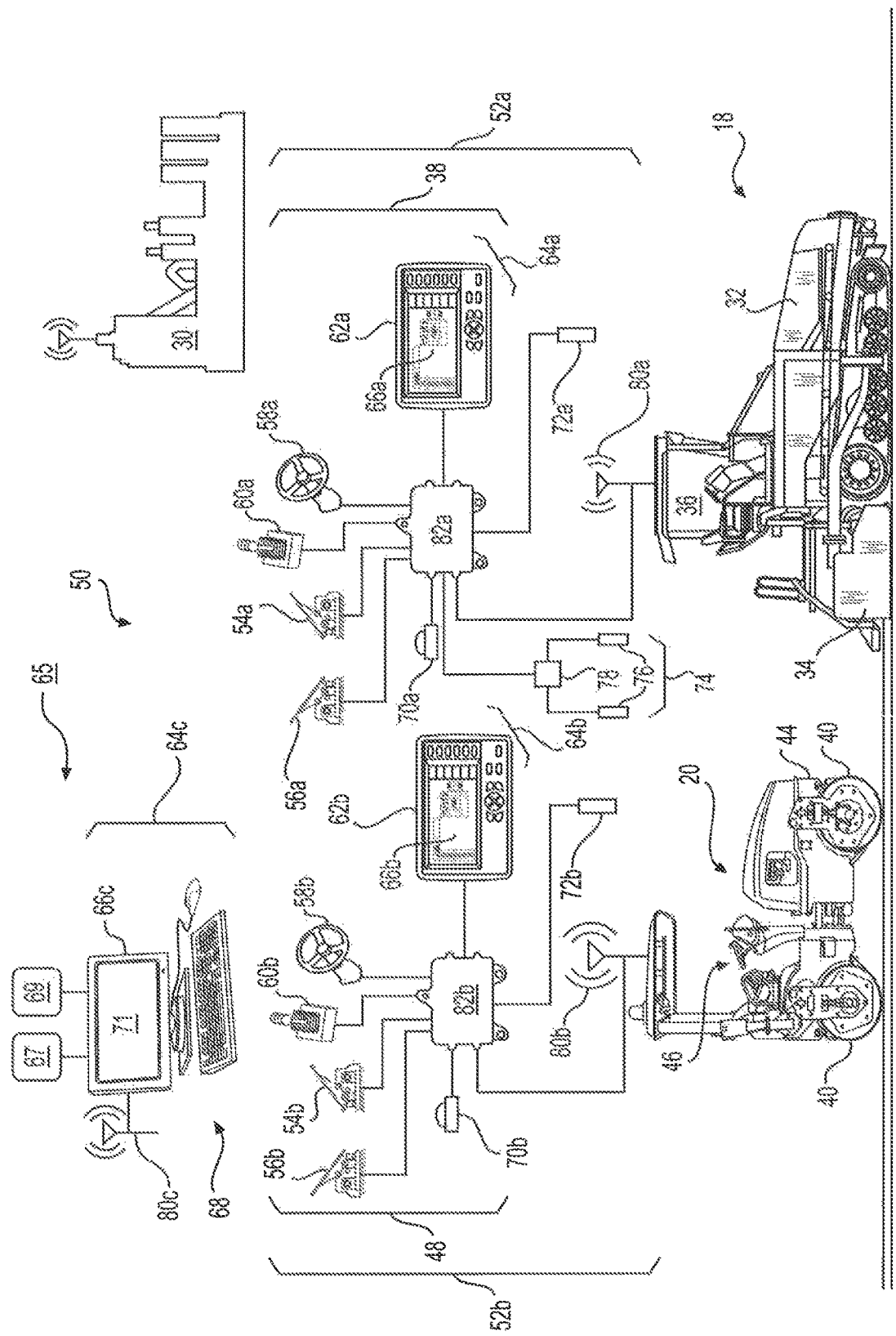
FIG. 2 is a diagrammatic illustration of an exemplary disclosed control system that may be used to coordinate the operations of the machines of FIG. 1.

As shown in FIG. 2, control system 50 provides operators and supervisors with the ability to observe and/or control aspects of the surfacing operation from asphalt production to the final compacting operation. Control system 50 is configured to collect data from each machine 12 and plant 30 and present the data to operators and supervisors in a format that allows them to quickly understand the state of the surfacing operation and coordinate tasks to avoid delays. Control system 50 includes one or more (e.g., a plurality of) machine control systems, each being configured to gather and process machine data, such as current and historical operating parameters, and allow operators and supervisors to view the data and respond by manipulating current operating parameters.

For example, FIG. 2 shows a first machine control system 52a associated with paver 18 and a second machine control system 52b associated with compactor 20. It is noted that although FIG. 2 only shows machine control systems 52a, 52b, other machines, such as haul trucks 16, and plant 30 may each include a similar associated control system. Each machine control system 52a, 52b includes a plurality of devices configured to allow for manual or automatic control of certain machine operations and adjustments of certain operating parameters particular to paver 18 or compactor 20, respectively. For instance, machine control system 52a associated with paver 18 includes control devices 38, and control system 52b associated with compactor 20 includes control devices 48.

Control devices 38 include devices that may be located onboard (e.g., in operator station 36) or off-board paver 18 that are configured to be used by personnel to control the operations and operating parameters of paver 18. For example, control devices 38 may include machine controls, such as an accelerator 54a for controlling the groundspeed of paver 18, a brake 56a for controlling the deceleration of paver 18, a steering device 58a for controlling the travel direction of paver 18, and a tool control 60a for controlling one or more tool positions and/or orientations. For instance, tool control 60a of paver 18 may be configured to control one or more of the height, width, and slope of screed 34. Tool control 60a embodies one or more levers, push buttons, switches, joysticks, etc. Although each of control devices 38 is shown in FIG. 2 as a separate device, it is understood that the functions of multiple control devices can be incorporated into a single device, such as a single joystick or electronic control device.

In some embodiments, control devices 38 include a multifunctional control device 62a configured to receive information from and provide information to personnel for controlling paver 18. For example, control device 62a includes one or more input devices 64a, such as buttons, soft keys, a keyboard, a mouse, a touch screen, etc., for receiving inputs from personnel indicative of information or requests for information relating to paver 18. Control device 62a also includes a display device 66a, such as an LED, LCD, CRT, or other type of display device configured to receive signals and/or show information associated with the signals. In some embodiments, control device 62a is an off-board entity, such as an off-board computer 68 that includes input device 64c and display device 66c and is configured to include or communicate with machines 12 and plant 30.

Off-board computer 68 may be a mobile device, such as a smartphone, a personal digital assistant (PDA), a tablet, or another type of mobile computing device. Alternatively, off-board computer 68 may be a desktop computer, a laptop computer, or a specialized computing device or other type of electronic device. Off-board computer 68 includes a processor 67 configured to carry out operations consistent with the present disclosure, associated memory 69 (e.g., RAM, ROM, flash, magnetic disk or tape, etc.) containing instructions for carrying out operations consistent with the present disclosure, and communications equipment (e.g., hardware and software), such as communication device 80c, configured to allow off-board computer 68 to communicate data with other electronic devices via wired or wireless platforms (e.g., cellular, Bluetooth, Wi-Fi, infrared, etc.). Off-board computer 68 includes one or more input devices 64c configured to receive user inputs and a display device 71. In some embodiments, input devices 64c includes display device 71. For example, in some embodiments, display device 71 is a multifunctional display device configured to display visual information and receive user inputs (e.g., via a touchscreen). In some embodiments, display device 71 is an output-only device (i.e., a device capable of displaying visual outputs via a screen portion but not capable of receiving in puts via the screen portion). Input devices 64c may also or alternative include other input devices, such as a mouse, a keyboard, a stylus, a remote control, and/or other input devices.

Control system 52a includes a locating device 70a configured to determine a two- or three-dimensional location of paver 18 with respect to a global or local coordinate system. For example, locating device 70a is configured to receive location signals from one or more (e.g., a plurality of) satellites associated with a global navigation satellite system (GNSS), such as Naystar Global Positioning System (GPS), GLONASS, Galileo, Beidou, etc. Locating device 70a uses the positioning signals to determine its own position (e.g., by trilateration) with respect to the coordinate system, which is used to determine the location of the paver 18.

Control system 52a includes one or more sensors 72a (only one shown), each being associated with an operating parameter or an actuator for carrying out commands from operators and supervisors received via control devices 38. Sensors 72a generate signals indicative of, for example, an operating parameter (e.g., a temperature, a pressure, a fluid level, etc.) or an actuator position that may be used to determine other information about paver 18, such as one or more other operating parameters. Sensors 72a may include a speed sensor configured to generate a signal indicative of the groundspeed of paver 18. Sensors 72*a* may also include a temperature sensor configured to generate a signal indicative of a temperature of asphalt in hopper 32. It is understood that sensors 72*a* may include other types of sensors configured to generate signals indicative of other operating parameters associated with paver 18 for determine current operating parameters and/or tracking operating parameters over a period of operating time.

For instance, in some embodiments, control system 52*a* includes a production monitoring system 74 configured to generate a signal indicative of an amount of material (e.g., asphalt) deposited by paver 18. Production monitoring system 74 includes one or more position sensors 76 configured to generate signals indicative of the width, height (e.g., height above work surface 14), or slope of screed 34 or its individual screed plates. Each position sensor 76 is associated with an actuator, such as a hydraulic or electronic actuator, configured to change the length, height, or slope of at least a portion of screed 34.

A control module 78 is associated with production monitoring system 74 and configured to determine the amount of material deposited by paver 18 based on the signals generated by position sensors 76. For example, in some embodiments, control module 78 is configured to determine an amount of material per unit distance traveled by paver 18 (e.g., based on the determined height and width of screed 34). Control module 78 is in electronic communication with other electronic devices included with or external to production monitoring system 74, such as sensors 72*a*, memory devices, and/or other computational devices, etc. Such devices may provide additional information used by control module 78 in determining the amount of material deposited by paver 18. For instance, when sensors 72*a* include a speed sensor configured to generate a signal indicative of the groundspeed of paver 18, control module 78 receives this signal as an input for determining a total amount (e.g., a total volume) of asphalt deposited on work surface 14 over a period of paving time. Additional information, such as the density of the paving material deposited may be stored in memory associated with control module 78 or received as an input by control module 78 from another source. Control module 78 is configured to use this additional information to determine the total weight (e.g., tons) or mass flow rate (e.g., tons per hour) of material deposited by paver 18.

In some embodiments, production monitoring system also or alternatively includes a material sensor and conveyor speed sensor associated with a conveying system (not shown) for moving material from hopper 32 to work surface 14 year screed 34. For example, the material sensor includes a mechanical sensor configured to detect a height of paving material being transferred on the conveyor system. Control module 78 is configured to use the material height in conjunction with the speed of the conveyor and known dimensions of the conveying system (such as dimensions of tunnels connecting hopper 32 to the rear side of paver 18 to determine the volume flow rate of material being deposited by paver 18. In some embodiments, the material sensors may alternatively embody an ultrasonic sensor, laser scanner, optical sensor, or another type of non-contact sensor configured to generate a signal indicative of a height or an area profile of the material on the conveyor system. Control module 78 is configured to use the material height and known dimensions of the conveying system in conjunction with the conveyor speed, or the area profile in conjunction with the conveyor speed to determine the volume flow rate of material deposited by paver 18. Control module 78 is configured to use the known density of the paving material in conjunction with the volume flow rate to determine the mass flow rate and/or total amount (e.g., weight) of material deposited by paver 18 over a period of conveying time.

Control system 52*a* also includes a communication device 80*a*. Communication device 80*a* include hardware and/or software that enables sending and receiving of data messages between paver 18 and off-board entities (e.g., others of machines 12, off-board computer 68, other devices, etc.). The data messages are sent and received via a direct data link and/or a wireless communication link, as desired. The direct data link may include an Ethernet connection, a connected area network (CAN), or another data link known in the art. The wireless communications may include one or more of satellite, cellular, Bluetooth, WiFi, infrared, and any other type of wireless communications that enables communication device 80*a* to exchange information. Data messages transmitted via communication device 80*a* may include any data generated or information determined by any of the other components of control system 52*a*, including operating parameters of paver 18 (e.g., groundspeed, asphalt temperature, amount of material deposited, mass flow rate, etc.)

Control system 52*a* also includes a controller 82*a* in electronic communication with the other components of control system 52*a*. As used herein, the phrase "electronic communication" refers to a configuration wherein data may be transferred via a wired connection, a wireless connection, or combinations thereof. As used herein, the term "controller" (e.g., with reference to controller 82*a* and/or other controllers described herein) may embody a computing device (e.g., a computer) having a single microprocessor or multiple microprocessors, computer memory (e.g., non-transitory computer-readable medium), and/or other components configured to receive inputs from other components of control system 50 and generating output signals based on the inputs. For example, controllers may include a memory, a secondary storage device, a clock, and a processing hardware for accomplishing a task consistent with the present disclosure. Numerous commercially available microprocessors can be configured to perform the functions of controllers described herein. It should be appreciated that controllers described herein could readily embody a general machine controller (e.g., an electronic control unit (ECU), central processing unit (CPU), etc.) capable of controlling numerous other machine functions. Various other known circuits may be associated with controllers described herein, including signal-conditioning circuitry, communication circuitry, and other appropriate circuitry.

Controller 82*a* is configured to receive data inputs from each component of control system 52*a*, process the data, and generate output signals based on the inputs and/or processed data. For example, controller 82*a* is configured to receive inputs from control system 52*a* and automatically generate machine commands, such as commands to adjust (e.g., increase or decrease) the groundspeed of paver 18, adjust the width, height, or slope of screed 34, adjust the travel direction of paver 18, and/or adjust a feed rate of paving material from hopper 32 to screed 34 (e.g., via the speed of the conveyor system). Controller 82*a* is also be configured to generate output signals to other components of control system 52*a*. For example, controller 82*a* is configured to generate graphical images indicative of operational information based on received inputs and display the graphical images on display device 66*a* for viewing by the operator of paver 18. The operational information indicated by the graphical images may represent data generated by control system 52*a*, information generated by control system 52*b* received via communication device 80a, or a combination thereof (e.g., data generated by each control system 52a, 52b or information based on data generated by each control system 52a, 52b). That is, controller 82a is configured to generate one or more output signals based on data generated by control system 52b of compactor 20.

In some embodiments, control system 52b is a second machine control system included in control system 50, and may also be particularly associated with compactor 20. For example, in some embodiments, control system 52b includes a plurality of devices, such as control devices 48, configured to allow for manual or automatic control of certain operations and adjustments of certain operating parameters particular to compactor 20. Control devices 48 include devices that may be located onboard (e.g., in operator station 46) or off-board compactor 20 that are configured to be used by personnel to control the operations and operating parameters of compactor 20. For example, in some embodiments, control devices 48 include machine controls, such as an accelerator 54b for controlling the groundspeed of compactor 20, a brake 56b for controlling the deceleration compactor 20, a steering device 58b for controlling the travel direction of compactor 20, and a tool control 60b for controlling one or more aspects of compacting tool 40.

Tool control 60b is configured to control one or more of the vibration frequency or vibration amplitude (i.e., the compacting force) of compacting tool 40. Tool control 60b is also be configured to provide control of other aspects of compactor 20, such as a watering system, lighting, canopy operations, a parking brake, etc. Tool control 60b may include one or more levers, push buttons, switches, joysticks etc. Although each of control devices 48 is shown in FIG. 2 as a separate device, it is understood that the functions of multiple control devices can be incorporated into a single device, such as a single joystick or electronic control device.

In some embodiments, control devices 48 include a multi-functional control device 62b configured to receive information from and provide information to personnel for controlling compactor 20. Control device 62b is similar to control device 62a and may include, for example, one or more input devices 64b and a display device 66b. In some embodiments, control device 62b is an off-board entity and, in some instances, is the same off-board entity as control device 62a.

Control system 52b may also include a locating device 70b configured to determine a two- or three-dimensional location of compactor 20 and a communication device 80b configured to communicate data with others of machines 12 and off-board computer 68. Locating device 70b may be similar to locating device 70a, and communication device 80b may be similar to communication device 80a.

Control system 52b also includes one or more sensors 72b (only one shown), each being associated with an operating parameter or an actuator for carrying out commands from operators and supervisors received via control devices 38. Sensors 72b generate signals indicative of an operating parameter (e.g., a temperature, a pressure, a fluid level, etc.) or an actuator position that may be used to determine other information about paver 18, such as one or more other operating parameters. For example, sensors 72b include a speed sensor configured to generate a signal indicative of the groundspeed of compactor 20. Sensors 72b also include a temperature sensor configured to generate a signal indicative of a temperature of work surface 14 (e.g., an infrared temperature sensor). It is understood that sensors 72b may include other types of sensors configured to generate signals indicative of other operating parameters associated with compactor 20 for determine current operating parameters and/or tracking operating parameters over a period of operating time.

Control system 52b also includes a controller 82b in electronic communication with the other components of control system 52b. Controller 82b may be structurally similar to controller 82a and is configured to receive data inputs from each component of control system 52b, process the data, and generate output signals based on the inputs and/or processed data. For example, controller 82b is configured to receive inputs from control system 52b and automatically generate machine commands, such as commands to adjust (e.g., increase or decrease) the groundspeed of compactor 20, adjust the compacting energy (e.g., the vibration frequency or magnitude) of compacting tool 40, and/or adjust the travel direction of compactor 20.

Controller 82b is be configured to generate output signals to other components of control system 52b. For example, controller 82b is configured to generate graphical images indicative of operational information based on received inputs and display the graphical images on display device 66b for viewing by the operator of compactor 20. The operational information indicated by the graphical images may include data generated by control system 52b, information generated by control system 52a received via communication device 80b, or a combination thereof (e.g., data generated by each control system 52a, 52b or information determined based on data generated by each control system 52a, 52b). That is, controller 82b is configured to generate one or more output signals based on data generated by control system 52a of paver 18.

To provide supervisors with greater access to information about each machine 12 and plant 30 (referring to FIG. 1), control system 50 is configured to gather data inputs from each machine control system 52a, 52b and plant 30 and present the information to supervisors in a visual format that can be quickly and easily understood. For example, control system 50 includes a portable or stationary computer configured to receive information from each machine control system 52a, 52b, such as off-board computer 68 equipped with a communication device 80c, and generate graphical images for conveying this information in a visual format at any location on or away from worksite 10. Although off-board computer 68 is particularly mentioned, it is understood that other computational devices (e.g., controller 82a, 82b) may be used to generate graphical images to convey this information.

In some embodiments, machine control systems 52a, 52b and plant 30 is in electronic communication with a central server configured to store programs and/or algorithms for processing information generated by machine control systems 52a, 52b and plant 30 and generating graphical images to convey the information. The server is accessible via communication hardware, such as communication devices 80a, 80b, and/or in conjunction with other communication networks, such as the Internet. That is, in some embodiments, control system 50 includes web-based features accessible to other electronic devices that are configured to convey information for monitoring and managing worksite 10.

INDUSTRIAL APPLICABILITY

The disclosed control system may be used with a plurality of machines where coordinating their respective operations on a worksite in an efficient and effective manner is important. The disclosed control system is particularly useful for coordinating road surfacing operations where multiple machines are used to deliver paving material from a material production plant, deposit the paving material into a work surface, and compact the freshly deposited paving material. A controller within the system can receive location data and other operating parameters relating to each machine and the plant. The controller is configured to generate graphical images on a display device based on the received information. The graphical images are configured to qualitatively and/or quantitatively convey the information from each machine and from the plant to allow operators and supervisors to quickly visualize and understand the state of operations on the worksite. The graphical images can be used to receive input from the operators and supervisors for controlling particular aspects of each machine. An exemplary operation of control system 50 will now be explained.

It is noted that any computational function performed by off-board computer 68 in the examples discussed below can also or alternatively be performed by another computational device, such as controller 82a, 82b, an off-board server, or another computerized device.

Figure 3:
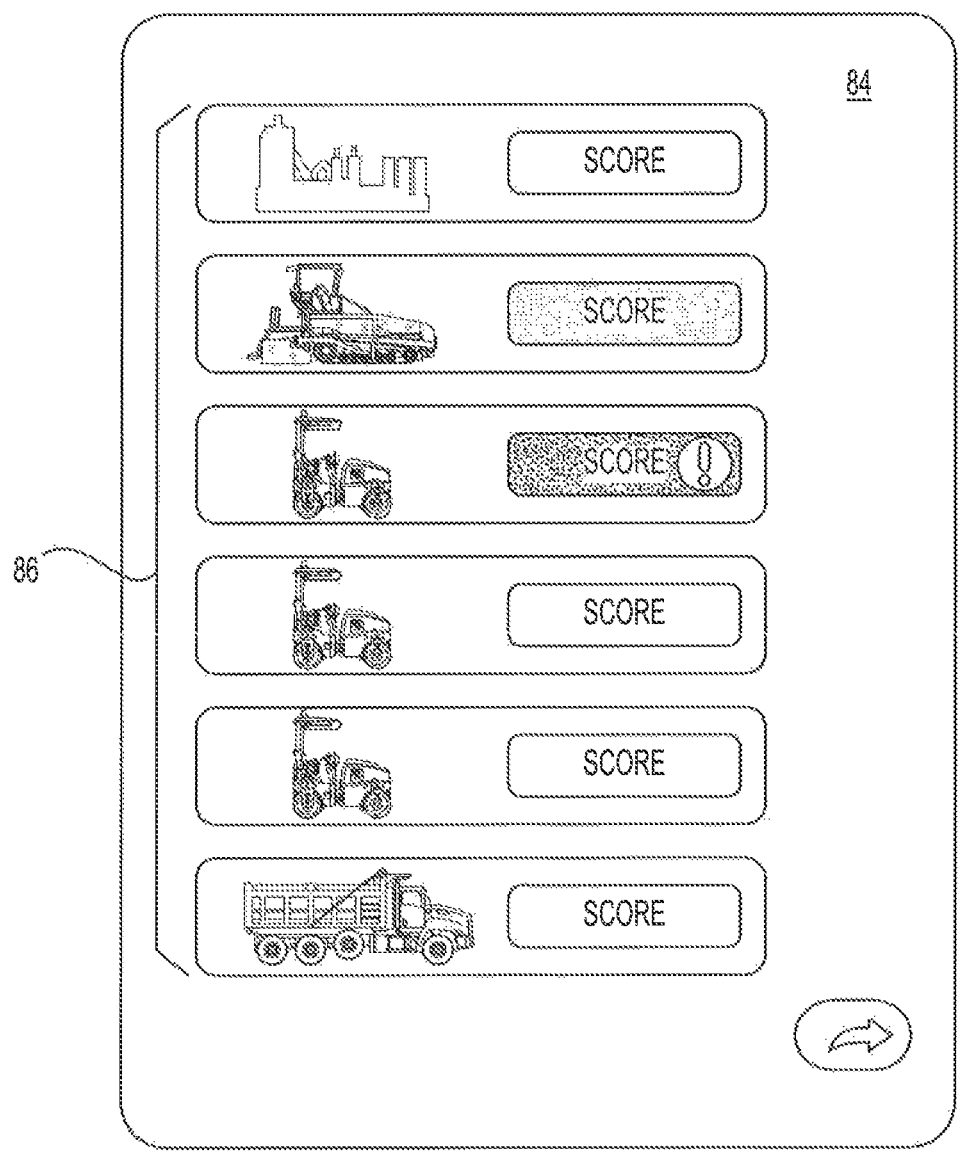
FIGS. 3-8 are pictorial illustrations of exemplary disclosed graphical user interfaces that may be generated by the control system of FIG. 2.

During a road surfacing operation, it is often a supervisor's responsibility to coordinate a plurality of machines (e.g., machines 12) for performing a paving operation on a worksite (e.g., worksite 10). To help coordinate machines 12, the supervisor is provided with access to a computer, such as off-board computer 68, from anywhere on or away from worksite 10 that is configured to provide operational information about each machine 12. Off-board computer 68 receives data messages from each machine 12 on worksite 10 via communication device 80c and uses the data messages to locate and identify each machine 12. For instance, each data message may contain GPS coordinates (e.g., generated by locating device 70a, 70b) and an associated machine ID. After determining which of machines 12 are present, off-board computer 68 generates on its display device 66c a first graphical user interface (GUI) 84, as shown in FIG. 3.

GUI 84 has a plurality of first graphical objects 86, each being indicative of one of the plurality of machines 12 (e.g., paver 18, compactors 20, etc.) or material production plant 30. Each of the plurality of graphical objects 86 is selectable via input device 64c associated with off-board computer 68 (referring to FIG. 2). Each of graphical objects 86 is also be indicative of a status score of the indicated machine 12 or material production plant 30. The status score of each machine 12 or plant 30 is an indication of whether and/or to what extent one or more operating parameters of each machine 12 or plant 30 deviates from an expected or target value or threshold value. In this way, supervisors are able to use GUI 84 to quickly determine which, if any, of machines 12 and plant 30 require attention and how to prioritize subsequent efforts to address any issues. Graphical objects 86 indicate which of machines 12 and plant 30 require attention based on differentiating visual indicia, such as a color scheme (e.g., red, yellow, green), textures, hatching, symbols, numerals, etc. It is understood that other types of indicia may be used.

Figure 4:
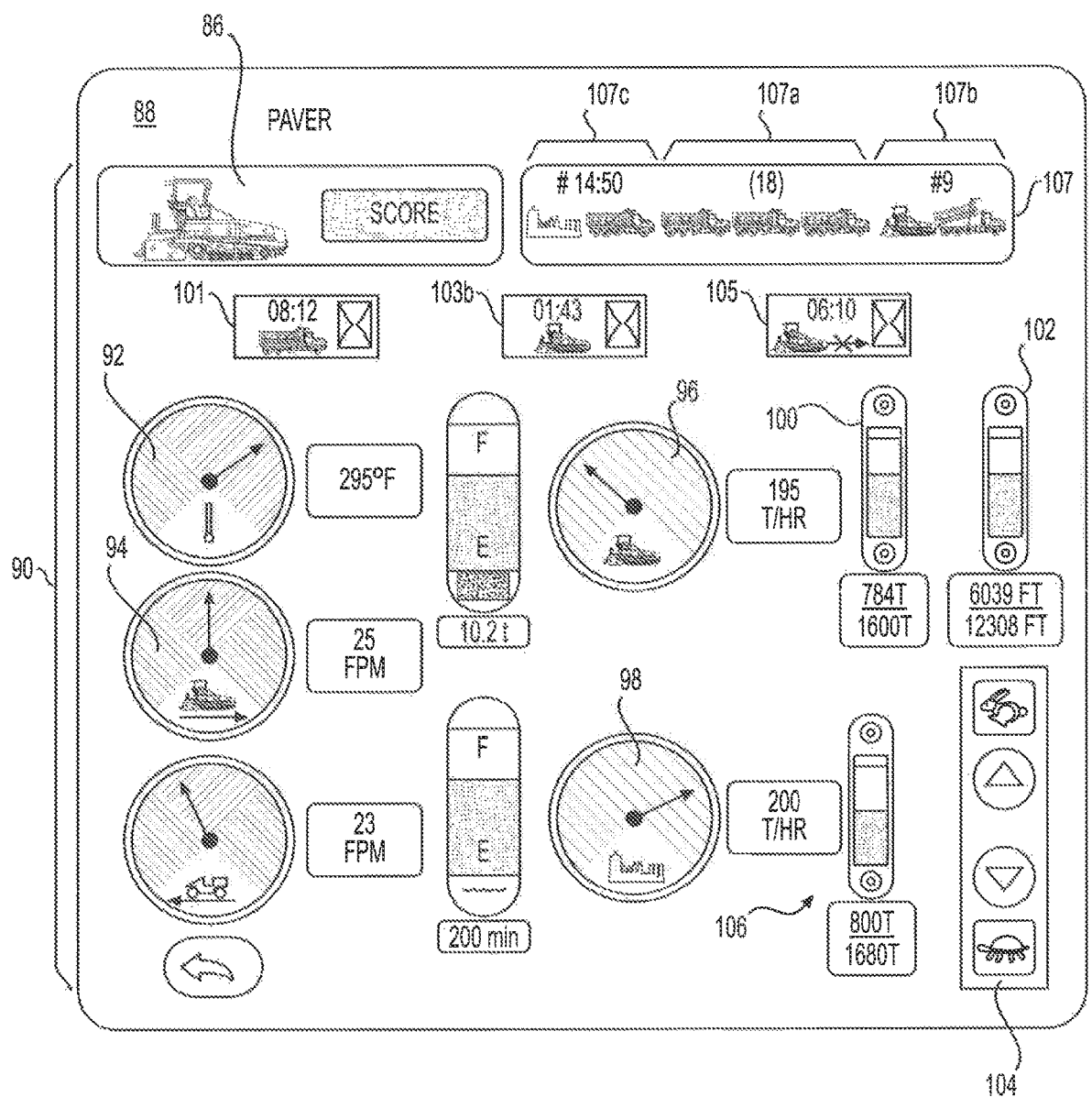

When a supervisor wishes to receive more detail about a particular machine 12 or plant 30, the supervisor selects one of graphical objects 86 via input device 64c. For example, when the supervisor selects the graphical object 86 indicative of paver 18, off-board computer 68 receives the supervisor's selection as an input and generates a second graphical user interface (GUI) 88 on display device 66a, as shown in FIG. 4, based on the selection. GUI 88 includes a plurality of graphical objects 90, each being indicative of a difference between one of the plurality of operating parameters and the associated expected or target value. That is, graphical objects 90 are indicative of the difference between each operating parameter and its associated target or expected value that was used to determine the status score of the selected machine 12 or plant 30.

As shown in the example of FIG. 4, graphical objects 90 of GUI 88 are indicative of the differences between operating and target parameters of or relating to paver 18. For example, graphical objects 90 include an asphalt temperature object 92, a paver groundspeed object 94, a paver production rate object 96, a plant production rate object 98, a total weight object 100 (i.e. of material deposited) and a total distance object 102 (i.e. distance paved). Such information may be used by a supervisor in determining how to coordinate operations of paver 18 and/or other machines 12 on worksite 10.

Off-board computer 68 receives data messages via communication device 80c indicative of the current asphalt temperature in hopper 32 (e.g., as determined by sensors 72a), groundspeed of paver 18 (e.g., as determined by sensors 72a), production rate of paver 18 (e.g., as determined by production monitoring system 74), production rate of plant 30, and amount of material deposited by paver 18 (e.g., as determined by production monitoring system 74), and/or other information. Off-board computer 68 compares the temperature of asphalt in hopper 32 to a known target temperature or temperature range (e.g., 190° F.-320° F.) and determines whether the current asphalt temperature is within, above, or below the target range. Asphalt temperature object 92 may include qualitative indicia, such as a dial with colored areas, that may allow an operator to quickly understand whether and to what extent the asphalt in hopper 32 is at an adequate temperature for paving. Although asphalt temperature object 92 is shown as a dial, other types of indicia may be used, such as bars, flashing lights, color schemes, etc. In this way, supervisors may be able to quickly determine whether any issue exists with regard to the asphalt temperature.

Off-board computer 68 also determines a target groundspeed for paver 18, compares the target groundspeed to the current groundspeed of paver 18, and generates paver groundspeed object 94 based on the difference. For example, off-board computer 68 compares the plant production rate to the paver production rate and determine whether paver 18 is depositing material onto work surface 14 at a faster or slower rate than plant 30 is producing material. Off-board computer 68 also concurrently generates paver production rate object 96 and plant production rate object 98 to allow the supervisor to visualize the difference between these production rates. As the production rate of plant 30 may dictate the maximum average production rate of paver 18, off-board computer 68 determines the target groundspeed of paver 18 to be a groundspeed at which the production rate of paver 18 is equal to or within an allowable difference of the plant production rate. For example, based on the width, height, and slope of screed 34 (referring to FIG. 2), as determined by sensors associated with production monitoring system 74 or known parameters, off-board computer 68 determines the groundspeed of paver 18 that will cause the production rate of paver 18 to be equal to or within a tolerable difference of the production rate of plant 30.

Off-board computer 68 then generates paver groundspeed object 94 to be indicative of the difference between the current groundspeed of paver 18 and the target groundspeed. Paver groundspeed object 94 may include features, such as a color scheme, hatching, blinking lights, etc., as an indication of the direction (e.g., higher or lower) and extent to which the current groundspeed is different from the target groundspeed. In this way, the supervisor sis able to quickly visualize and understand the relative production rates of plant 30 and paver 18. This information can be used by the supervisor to determine whether and how the operations of paver 18 should be adjusted in order to bring the production rate of paver 18 to the target rate. For instance, the supervisor is able to use this information to determine that the groundspeed of paver 18 should be adjusted. The supervisor can then communicate with the operator of paver 18 (e.g., via radio, cellular communications, onboard display, etc.) to effectively achieve the desired speed change or other operational adjustment.

In some embodiments, GUI 88 may include a graphical object 104 configured to receive a user input indicative of a command to adjust (e.g., increase or decrease) the groundspeed of paver 18 to an adjusted groundspeed. When the supervisor determines, based on the information in GUI 88, that paver 18 is depositing material at a slightly slower rate than plant 30 is producing it, the supervisor can then use graphical object 104 to override control of the groundspeed of paver 18 and to visualize whether and to what extent the production rate of paver 18 can become closer to the production rate of plant 30 when operated at the adjusted groundspeed. In some embodiments, adjustments to the groundspeed of paver 18 made via graphical object 104 initiate a simulation mode, which includes the generation of an additional graphical user interface for displaying simulation parameters and results. The additional graphical user interface is a GUI, such as a duplication of GUI 88 that contains updated or regenerated graphical objects that show any changes to the operating parameters displayed in GUI 88 that may be affected by changing the groundspeed of paver 18.

GUI 88 enables the supervisor to understand the effects of changing the groundspeed of paver 18 on the paving operation by the resulting changes in other operational parameters displayed via GUI 88 (or its duplicate). For example, if paver 18 is running too slowly, it may be using material more slowly than plant 30 is producing it. Depending on how long paver 18 was using less material than plant 30 was producing it, paver 18 may have fallen behind on the amount of material it is supposed to deposit for a given period of time, such as for the current day. GUI 88 allows the supervisor to compare the total amount of material deposited or the total distance traveled by paver 18 to a target amount or target distance for the current day, as provided by total weight object 100 and total distance object 102, to decide whether or not to increase the ground speed of paver 18 so the production rate of paver 18 is greater than the production rate of plant 30 in order to make up for lost time. GUI 88 also includes a graphical object 106 indicative of a total amount of material produced by plant 30 and a total amount of material available from plant 30 for the current day, the current job, or other allotment criterial. GUI 88 allows the operator to then be able to see how these production parameters respond to a change in paver groundspeed by using graphical object 104. Based on this information, the supervisor can determine whether or not a decision to increase the production rate of paver 18 above the production rate of plant 30 will starve paver 18 or whether it is necessary to contact another plant about receiving additional material to help meet production goals.

Although graphical object 104 has been described with reference to the groundspeed of paver 18, it is understood that other or additional adjustable parameters may instead be alterable by graphical object 104 or additional graphical objects, if desired. For example, screed settings (e.g., width, height, slope), conveyor feed rates, and or other parameters may be made adjustable via GUI 88 for purposes of simulation or overriding machine control.

After the supervisor adjusts the groundspeed of paver 18 using graphical object 104, off-board computer 68 is configured to update (i.e., regenerate) GUI 88 or some of graphical objects 90 to reflect the difference on any operating parameter that the supervisor's actions may have. In some embodiments, inputs received by graphical object 104 are used to cause off-board computer 68 to generate command signals communicable to paver 18 (i.e., machine control system 52*a*) for automatically adjusting the actual groundspeed of paver 18. In other embodiments, off-board computer 68 is configured to enter a simulation mode or generate a simulation interface, as mentioned above, that is configured to reproduce GUI 88 using a simulation model or algorithm configured to predict and display how the change in groundspeed of paver 18 commanded by the supervisor will affect the paving operation. In other embodiments, GUI 88 includes other graphical objects to allow the supervisor to similarly adjust other aspects of paver 18, such as height, width, and slope of screed 34 and the feed rate of material from hopper 32 to screed 34.

As off-board computer 68 receives updated operating parameters from machines 12 and plant 30, as well as after any time the supervisor makes an adjustment to the groundspeed or other parameter of paver 18 during a simulation, off-board computer 68 is configured to reevaluate the status score of paver 18. That is, off-board computer 68 is configured to compare the current operating parameters (or simulated current operating parameters) of paver 18 to the target parameters and determine whether and to what extent they differ. Off-board computer 68 is configured to then update first graphical objects 86 on GUI 84. As shown in FIG. 4, the first graphical object 86 associated with the selected machine 12 (e.g., paver 18) is shown in GUI 88 (or a duplicate GUI generated during a simulation) to allow the supervisor to see the updated status score without having to return to GUI 84 (referring to FIG. 3), thereby allowing for a speedy adjustment process.

In some embodiments, GUI 88 contains additional or other graphical objects configured to convey information about paver 18 and/or others of machines 12. For example, off-board computer 68 is configured to receive signals indicative of the location and groundspeed of each other machine 12, including haul trucks 16 (referring to FIG. 1). Based on the location and groundspeed of each machine 12, off-board computer 68 is configured to determine relevant statistical information and display the information via graphical objects. For instance, GUI 88 includes a graphical object 101 configured to display an amount of time until the next haul truck 16 arrives at paver 18 with fresh paving material. That is, location information associated with each haul truck 16 is received via an associated location device, which can be used in conjunction with the known location of paver 18 to determine the amount of time until the next haul truck 16 arrives at paver 18. Based on the time until the next haul truck 16 arrives, the supervisor can quickly understand whether adjustments to the production rate or groundspeed of any machine may be appropriate to avoid a delay in production or to avoid a delay in the use of fresh material (which can allow the fresh material to cool below a desired threshold temperature).

In some embodiments, GUI 88 includes a graphical object 103*a* indicative of a fill level of hopper 32 and a graphical object 103*b* indicative of an amount of time until hopper 32 will become empty. An amount of material remaining in hopper 32 is determined, for example, based on the signal generated by production monitoring system 74, which is then used in connection with the production rate of paver 18 to determine an amount of time remaining until hopper 32 becomes empty. Graphical objects 103*a* and 103*b* are configured to convey the remaining amount of material and remaining time, respectively, so the supervisor can quickly and easily understand how much material is in hopper 32 and for how long paver 18 can continue production without having to pause to refill hopper 32. Information provided by graphical objects 103*a* and 103*b* in conjunction with the information provided by graphical object 101 allows a supervisor to quickly and easily decide whether and to what extent the groundspeed of paver 18 or of the next haul truck 16 should be adjusted (if possible) to minimize downtime and asphalt cooling time.

In the even that production is paused and paver 18 is stopped, GUI 88 includes a graphical object 105 that is indicative of an amount of time that paver 18 has been stopped and continues to sit idly. The groundspeed of paver 18 is determined, for example, based on a signal generated by a speed sensor or a positioning sensor, and the groundspeed is tracked over a period of paving time to determine when the groundspeed of paver 18 is zero (i.e., when paver 18 is not moving or is idle). Graphical object 105 is configured to convey the amount of time during which the groundspeed of paver 18 is zero (i.e., an idle time). As paver 18 sits idly, the paving material in hopper 32 can cool, and may need to be discarded if the idle time exceeds a threshold amount of time. Thus, graphical object 105 allows the supervisor to quickly and easily determine how long paver 18 has been idle and whether certain actions may need to be taken as a result of the elapsed time. Further, the weight of screed 34 can create grooves or other defects in the freshly laid asphalt if paver 18 sits idly for too long, which may require additional manpower, material, and time to repair. Thus graphical object 105 assists the supervisor to decide how to avoid or when to repair such defects When plant 30 is some distance (and time) away from worksite 10, supervisors often wish to be informed of certain details and parameters relating to the supply chain of haul trucks 16 bringing material from plant 30 to worksite 10. To help provide supervisors with information about the supply chain, GUI 88 includes a graphical object 107 configured to convey one or more supply chain parameters in a clear and simple way. For instance, GUI 88 includes a graphical object 107*a* indicative of a number of haul trucks 16 that are traveling between plant 30 and worksite 10 with fresh paving material. This information allows supervisors to quickly understand, among other things, whether the supply chain is operating properly, whether pauses in production for lack of material are to be expected, or whether too much fresh material is in queue and is at risk of excessive cooling. A graphical object 107*b* is configured to identify the truck 16 currently at paver 18 to allow the supervisor to understand which truck 16 in the scheduled queue of truck is currently filling hopper 32. A graphical object 107*c* is configured to identify the truck currently being loaded with fresh material at plant 30 and its estimated arrival time at jobsite 10. This information allows the supervisor to understand quickly how far along in the production process plant 30 is with respect to the scheduled production plan and how much time haul trucks 16 are currently taking to reach jobsite 10. Information conveyed by graphical objects 107*a-c* are determined, for example, based on other supply chain parameters, such as the locations (e.g., as determined by a location device) and groundspeeds (e.g., as determined by a location device or speed sensor) of haul trucks 16.

Although certain graphical objects that may be indicative of certain parameters are shown in FIG. 4 (and other figures) and described herein, it is understood that other graphical objects indicative of other and/or additional parameters or information may be used to convey aspects relating to paving operations and support.

Parameters and other information indicated by the graphical objects contained in a graphical user interface (e.g., GUI 88) may each be associated with a respective threshold value or target value. The difference between the information displayed by a graphical object and its associated threshold or target value are used to determine the status score of the machine 12 or plant 30 that is the subject of the graphical user interface. For instance, graphical object 86 in GUI 88 is configured to indicate the status score of paver 18 based on a difference between the information displayed in any of the graphical objects in GUI 88 and its respective associated threshold or target value. For example, when the paver stop time as indicated by graphical object 105 exceeds an associated threshold, graphical object 86 shows, for example, a yellow or red status score, depending on the extent to which the stop time has exceeded the threshold. When paver 18 resumes operation (and if no other parameters are currently in excess of an associated threshold), the status score in graphical object 86 is changed, for example, to the color green to indicate that the state of paving operations is acceptable. Graphical objects 86 as shown in FIG. 3 are configured to change color (or other indicia) in coordination with graphical objects 86 of other graphical user interfaces. It is understood that although the status score has been explained above with respect to the stop time of paver 18 and GUI 88, status scores may be affected by other parameters (e.g., groundspeed, production rate, fuel level, water level, etc.) or differences between them. It is also understood that status scores for other machines (e.g., compactors 20, trucks 16, and plant 30) may be similarly determined. In this way, supervisors are able to quickly and easily identify when issues arise that may need their attention.

Figure 5:
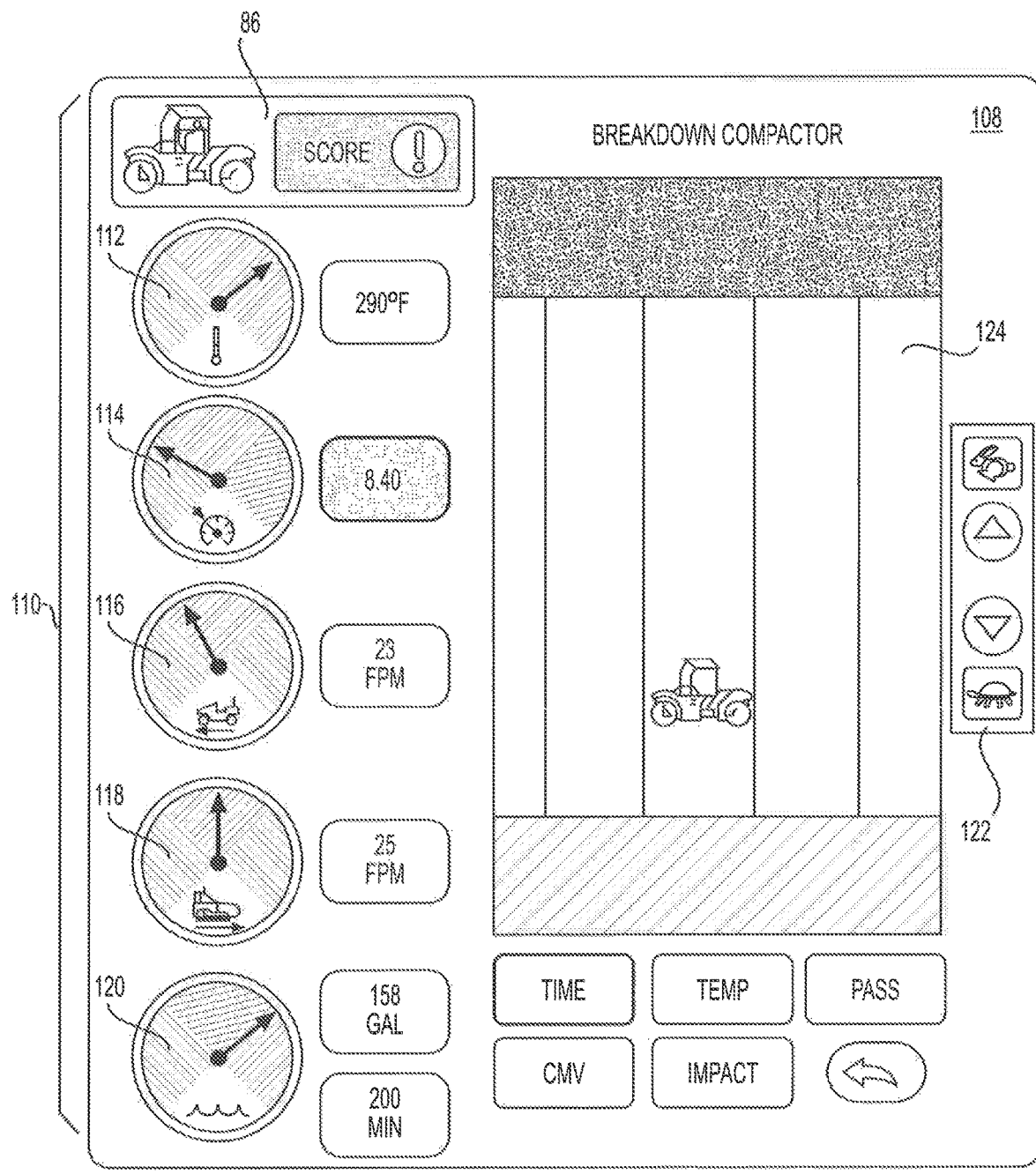

Referring again to FIG. 3, when the supervisor selects a first graphical objet 86 associated with another of machines 12, off-board computer 68 generates another GUI corresponding to the selecting machine 12. For example when the supervisor selects a first graphical object 86 associated with one of compactors 20, off-board computer 68 generates a corresponding GUI. For example, as shown in FIG. 5, off-board computer generates a graphical user interface (GUI) 108 corresponding to a particular compactor 20 (e.g., a breakdown compactor). GUI 108 contains graphical objects 110 indicative of a difference between an operating parameter associated with compactor 20 and an associated expected or target value. That is, graphical objects 110 is indicative of the difference between an operating parameter and its associated target or expected value that was used to determine its status score displayed in GUI 84.

For example, graphical objects 110 include a surface temperature object 112, an impacts object 114, a compactor groundspeed object 116, a paver groundspeed object 118, and a water object 120. Such information can be used by a supervisor in determining how to coordinate operations of compactor 20 in conjunction with the operations of paver 18 and/or other machines 12 on worksite 10.

Off-board computer 68 is configured to receive data messages via communication device 80*c* indicative of the current temperature of the freshly laid asphalt on top of work surface 14 (e.g., as determined by sensors 72b), the groundspeed of compactor 20 (e.g., as determined by sensors 72b), the groundspeed of paver 18 (e.g., as determined by sensors 72a), an amount of water for wetting compacting tool 40 (e.g., as determined by sensors 72b), and the location of compactor 20 (e.g., as determined by locating device 70b). Off-board computer 68 is configured to compare the temperature of work surface 14 to a known target temperature or temperature range (e.g., 320° F.-190° F.) and determine whether the current temperature of work surface 14 is within, above, or below the target range. After paver 18 lays down a mat of fresh material, compactor 20 (i.e., a breakdown compactor) may be instructed to compact the fresh mat while it is still at a particular temperature or within a particular temperature range. This instruction requires compactor 20 to follow behind paver 18 at a certain distance that is dependent on the mat temperature. When the temperature of surface 14 is outside of the desired range, as indicated by surface temperature object 112, the supervisor can adjust the distance between compactor 20 and paver 18 or pause the operation for further assessments.

At times, an operator of compactor 20 may intentionally or inadvertently put too much or too little distance between compactor and paver 18 during the compacting process and attempt to correct this distance. In doing so, a ratio of the vibration frequency associated with compacting tool 40 to the groundspeed of compactor can deviate from a desired ratio or range of ratios. Off-board computer 68 receives, via communication device 80c, signals indicative of the vibration frequency of compacting tool 40 and the groundspeed of compactor 20 from machine control system 52b (referring to FIG. 2). The ratio of the vibration frequency to the groundspeed of compactor 20 is indicative of the compacting energy (i.e., number of impacts per foot) applied to work surface 14 by compactor 20. When compactor slows down or speeds up, the number of impacts per foot increase or decreases, respectively. Depending on which compacting stage compactor 20 is performing (e.g., breakdown, intermediate, cleanup, etc.), compactor 20 can be assigned a certain target ratio (i.e., target compacting energy) or target number of impacts per foot maintain during operation.

To help supervisors understand when the ultimate goal of imparting the target number of impacts per foot on work surface 14 is or is not being achieved, off-board computer 68 generates impacts object 114 to indicate the direction (e.g., higher or lower) and extent to which the current number of impacts per foot is different than the target number of impacts per foot. Impacts object 114 includes qualitative indicia, such as a dial with colored areas, bars, flashing lights, color schemes, etc. In this way, supervisors can quickly determine whether any issue exists with regard to the number of impacts per foot being achieved by compactor 20.

Off-board computer 68 also determines a target groundspeed for compactor 20, compare the target groundspeed to the current groundspeed of compactor 20, and generate compactor groundspeed object 116 based on the difference. For example, off-board computer 68 receives and compare the paver groundspeed compactor groundspeed determined by sensors 72a and 72b, respectively. When the groundspeed of paver 18 dictates the average groundspeed at which compactor 20 should travel to maintain a constant distance from paver 18, off-board computer 68 determines the target groundspeed of compactor 20 to be a speed equal to or within an allowable difference of the groundspeed of paver 18.

Off-board computer 68 then generates compactor groundspeed object 116 to be indicative of the difference between the current groundspeed of compactor 20 and the target groundspeed. Off-board computer 68 also concurrently generates paver groundspeed object 118 to allow the supervisor to confirm whether any differences in impacts per foot or the detected temperature of work surface 14 are attributable to a deviation of compactor 20 from its target groundspeed. Compactor groundspeed object 116 may include features, such as a color scheme, hatching, blinking lights, etc., as an indication of the direction (e.g., higher or lower) and extent to which the current groundspeed is different from the target groundspeed. In this way, the supervisor is able to quickly visualize and understand the relative groundspeeds of compactor 20 and paver 18, as well as the implications this difference may have on other operating parameters. This information allows the supervisor to determine whether and how to adjust the operations of compactor 20. Such an adjustment includes increasing or decreasing the groundspeed of compactor 20.

In some embodiments, GUI 108 includes a graphical object 122 configured to receive a user input indicative of a command to adjust (e.g., increase or decrease) the groundspeed of compactor 20 to an adjusted groundspeed. For instance, the supervisor may at times determine, based on the information in GUI 108, that compactor 20 is moving away from an area of paved surface 14 at the target temperature for compacting or that the number of impacts per foot being achieved is too low. Graphical object 122 enables the supervisor to increase or decrease the groundspeed of compactor 20 to cause the number of impacts per foot and/or the temperature of surface 14 in front of compactor 20 to reach the respective target value.

Depending on how long compactor 20 was moving farther or closer to paver 18, it can be difficult to achieve the proper distancing through groundspeed adjustments without falling below the target amount of impacts per foot. To help confirm that compactor 20 is meeting its target number of impacts per foot, GUI 108 includes a map 124 of at least a portion of worksite 10 where compactor 20 is operating. Using the location of compactor 20 over time, as determined by locating device 70b (referring to FIG. 2), off-board computer 68 is configured to generate map 124 to be indicative of where compactor 20 has traveled and number of impacts per foot achieved at each location (e.g., using a color scheme, hatching, patterns, etc.). Based on this information, the supervisor is able to determine whether or not a decision to increase or decrease the groundspeed of compactor 20 is improving the compacting operation.

After the supervisor adjusts the groundspeed of compactor 20 using graphical object 122, off-board computer 68 updates (i.e., regenerates) GUI 108 or some of graphical objects 110 to reflect the difference on any operating parameter that the supervisor's actions may have. In this way, the supervisor are able to quickly identify an effective solution after performing one or more iterative adjustments. In some embodiments, inputs received by graphical object 110 cause off-board computer 68 to generate command signals communicable compactor 20 (i.e., machine control system 52b) for automatically adjusting the actual groundspeed of compactor 20. In other embodiments, off-board computer 68 enters a simulation mode or generate a simulation interface configured to reproduce GUI 108 using a simulation model or algorithm configured to predict and display how the change in groundspeed of compactor commanded by the supervisor will affect the compacting operation.

Although graphical object 122 has been described with reference to the groundspeed of compactor 20, it is understood that other or additional adjustable parameters may instead be alterable by graphical object 122 or additional graphical objects, if desired. For example, vibration settings, water feed rates, following distances, and or other parameters may be made adjustable via GUI 88 for purposes of simulation or overriding machine control.

In some embodiments, GUI 108 includes other graphical objects to allow the supervisor to similarly adjust other aspects of compactor 20. For example, water object 120 is indicative of how much water remains in a storage tank onboard compactor 20. When compactor 20 includes a watering system for wetting compacting tool 40 to prevent fresh asphalt from sticking to it during compaction, water object is indicative of an amount of water remaining (e.g., as determined by sensors 72*b*). In this way, the supervisor is able to determine when to refill the water tank based on the water level and/or other aspects of the operation that may provide an opportunity to refill without incurring delay or sacrificing compaction quality.

As off-board computer 68 receives updated operating parameters from machines 12 and plant 30, as well as after any time the supervisor makes an adjustment to the groundspeed or other parameter of compactor 20, off-board computer 68 reevaluates the status score of compactor 20. That is, off-board computer 68 compares the current operating parameters (or simulated current operating parameters) of compactor 20 to the target parameters and determines whether and to what extent they differ. Off-board computer 68 then updates first graphical objects 86 on GUI 84 to reflect any changes. As shown in FIG. 4, the first graphical object 86 associated with the selected machine 12 (e.g., compactor 20) are shown in GUI 108 to allow the supervisor to see the updated status score without having to return to GUI 84 (referring to FIG. 3), thereby allowing for a speedy adjustment process.

Figure 6:
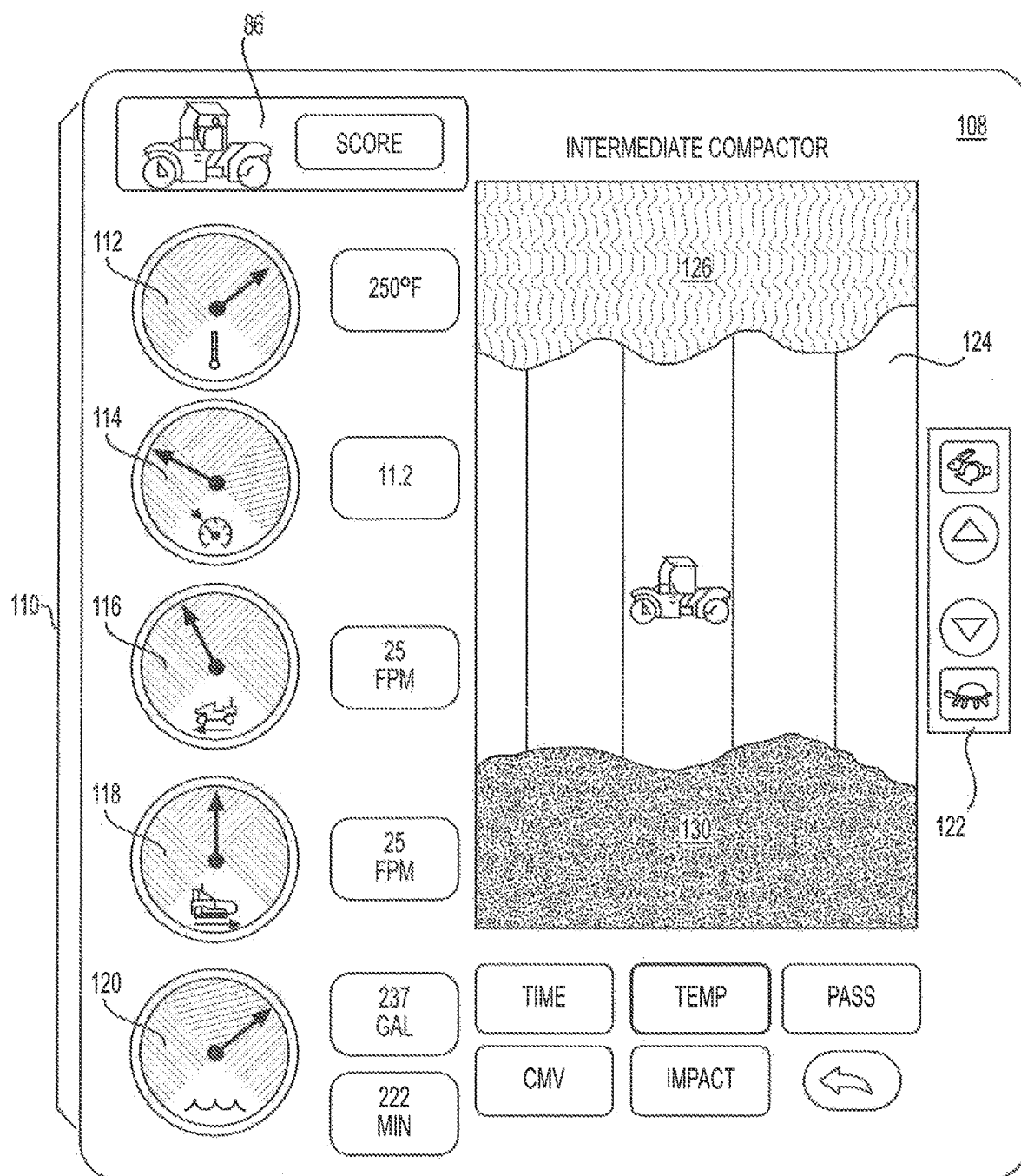

In some embodiments, GUI 108 contains additional or other information configured allow the supervisor to visualize aspects of the compacting operation in great detail. For example, as shown in FIG. 6, map 124 is configured to display additional information in coordination with the location of compactor 20 over a period of operating time. For instance, in addition to the number if impacts per foot achieved by compactor 20, off-board computer 68 is configured to show the determined surface temperature of work surface 14, a pass count (i.e., number of times compactor traveled over a particular location), and/or compaction value (i.e., compaction quality factor) as a function of the location of compactor 20. Off-board computer 68 associates one or more of the ratio of the vibration frequency to the groundspeed of compactor 20, the surface temperature of work surface 14, the pass count, and the compaction value with each recorded location of compactor 20 over a period of compacting time, and configures map 124 to indicate the associated value(s) in coordination with each recorded location. For example, when the supervisor selects an option to see the temperature of surface 14 when it was compacted by compactor 20, off-board computer 68 generates map 124 to show the current location of compactor 20 in coordination with the sensed temperature of work surface 14 when it was traversed by compactor 20. Map 124 also or alternatively is configured to show the current temperature of surface 14 to allow the supervisor to see if compactor 20 is operating in areas 126, 128, or 130 that are above, at, or below the target temperature, respectively, for compaction. In this way, supervisors are able to confirm whether areas of surface 14 have been or are being properly compacted, allowing for quick corrective measures to be taken when necessary.

Figure 7:
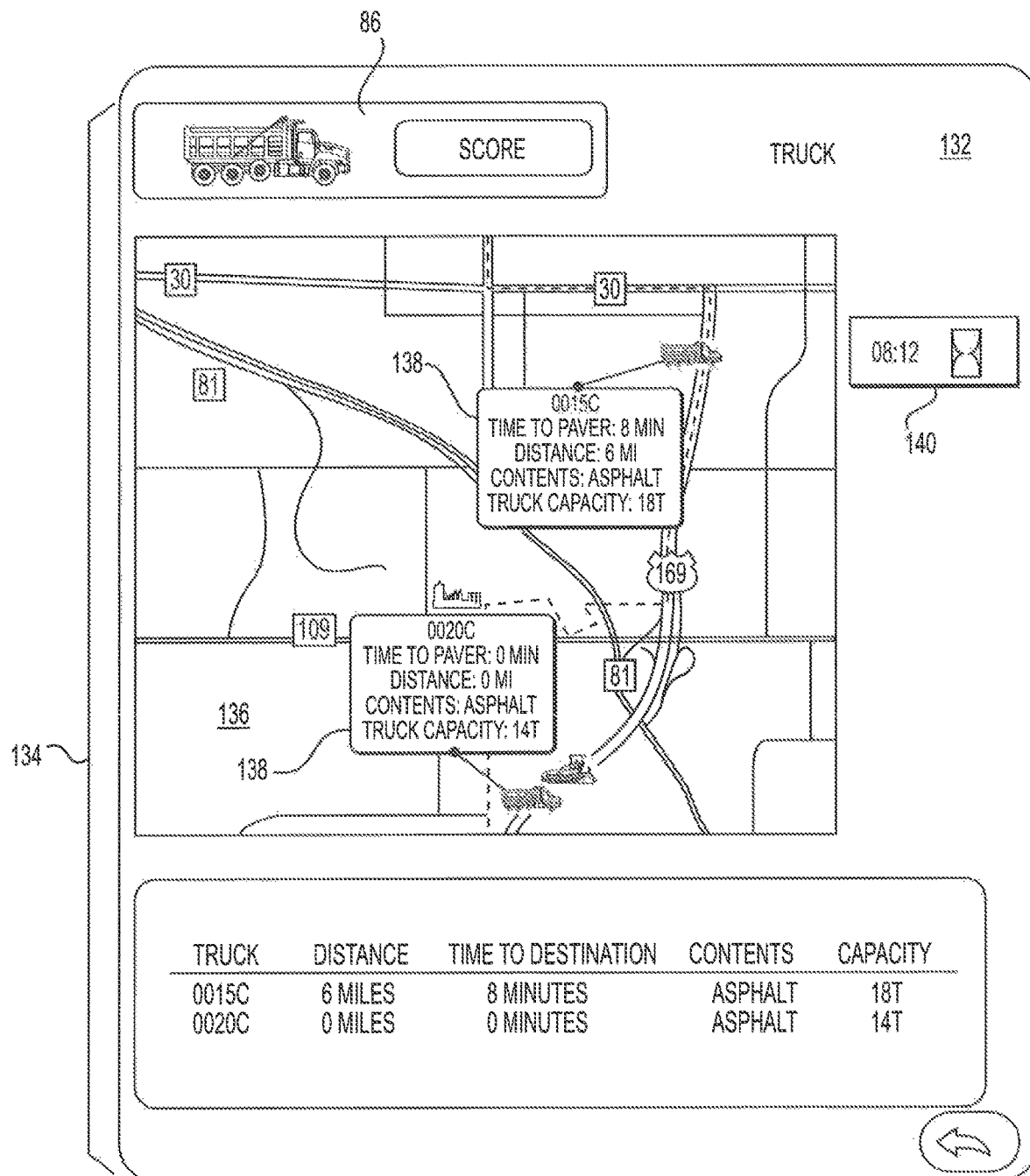

Referring again to FIG. 3, when the supervisor selects a first graphical objet 86 associated with another of machines 12, off-board computer 68 generates another GUI corresponding to the selected machine 12. For example when the supervisor selects a first graphical object 86 associated with one of haul trucks 16, off-board computer 68 generates a corresponding GUI. For example, as shown in FIG. 7, off-board computer 68 generates a graphical user interface (GUI) 132 corresponding to a particular haul truck or a group of haul trucks associated with the surfacing operation. GUI 132 contains graphical objects 134 indicative of a difference between an operating parameter associated with compactor 20 and an associated expected or target value. That is, graphical objects 134 may be indicative of the difference between an operating parameter and its associated target or expected value that was used to determine the status score displayed in GUI 84.

For example, based on other information, such as the production rate of paver 18, the amount of material in hopper 32, and/or the number of trucks traveling between plant 30 and worksite 10 (as discussed above), off-board computer 68 determines a target arrival time for each haul truck 16 traveling to worksite 10 with fresh paving material. The target arrival time is an amount of time until a particular haul truck is needed to deliver material to paver 18. Based on a current location of each haul truck 16 (as determined by an associated location device configured to generate a location signal communicable to off-board computer 68), off-board computer 68 determines an actual estimated arrival time for each haul truck 16 at worksite 10. Off-board computer 68 also receives other information, such as traffic conditions, weather conditions, road closure information, and/or other factors available through known (e.g., commercial) resources and use this information to more accurately determine the target and actual arrival time for each haul truck.

Off-board computer 68 generates a map 136 of an area containing one or more of haul trucks 16, paver 18, and/or plant 30, and generates a haul truck detail object 138 for each haul truck 16 on the map. Haul truck detail object 138 include information, such as a target time to paver 18, a distance to paver 18, contents of haul truck 16, and a capacity (e.g. weight) of material in haul truck 16. In some embodiments, haul truck detail object 138 also include an actual or estimated temperature of the paving material within haul truck 16. Off-board computer 68 generates an actual estimated arrival time object 140 configured to show the actual estimated arrival time of haul truck 16. When a difference between the actual estimated arrival time and the target arrival time exceeds a tolerable difference, off-board computer 68 updates the status score of haul truck 16 to indicate whether and to what extent haul truck 16 will miss the target arrival time. Off-board computer 68 then updates first graphical objects 86 on GUI 84 to reflect any changes. As shown in FIG. 7, the first graphical object 86 associated with the selected machine 12 (e.g., haul truck 16) are shown in GUI 132 to allow the supervisor to see the updated status score without having to return to GUI 84 (referring to FIG. 3), thereby allowing for a speedy assessment process.

Figure 8:
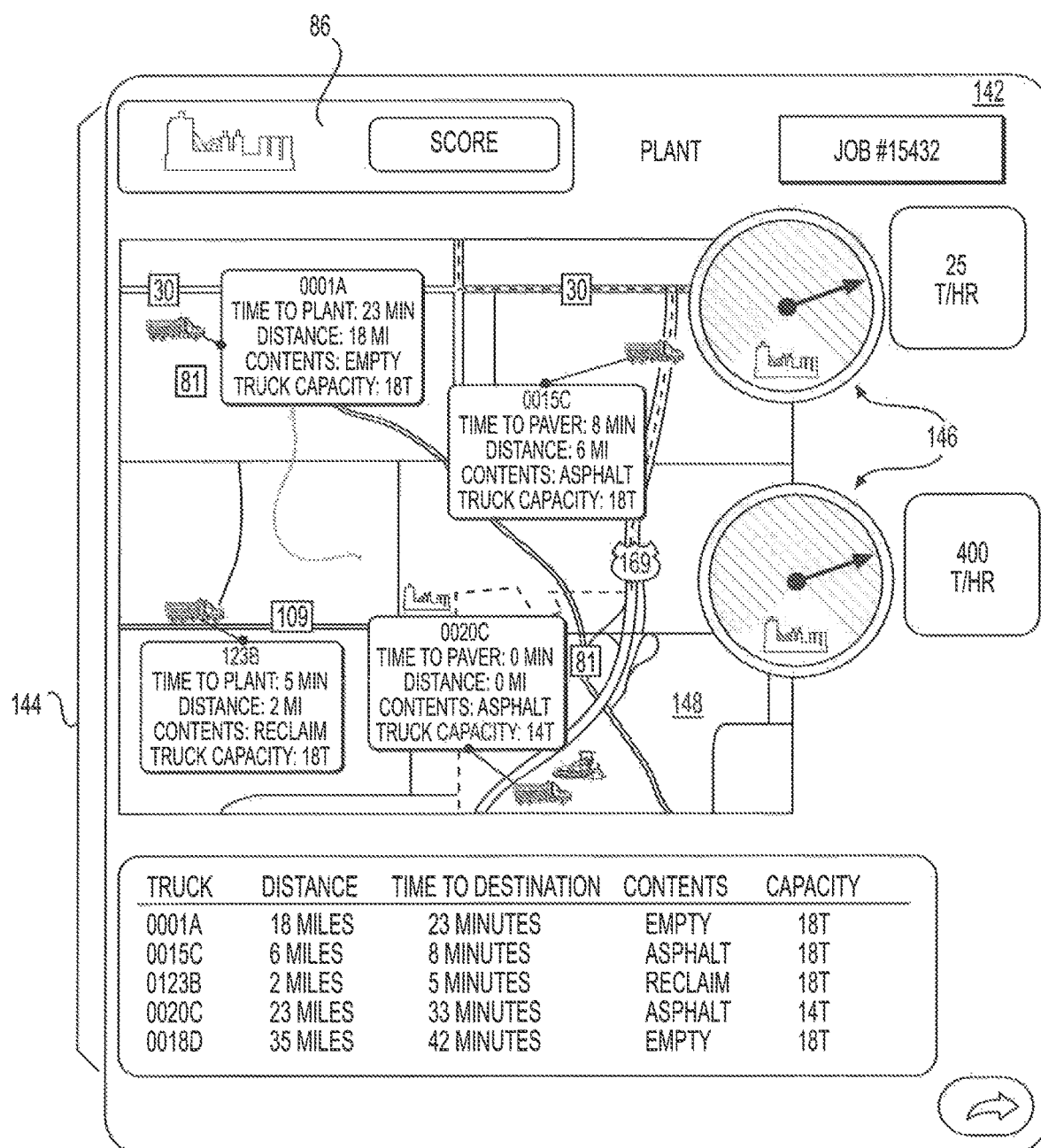

Referring again to FIG. 3, when the supervisor selects a first graphical objet 86 associated with plant 30, off-board computer 68 generates another GUI corresponding to plant 30. For example, as shown in FIG. 8, off-board computer 68 generate a graphical user interface (GUI) 142 that contains graphical objects 144 indicative of a difference between an operating parameter associated with plant 30 and an associated expected or target value. That is, graphical objects 144 are indicative of the difference between an operating parameter and its associated target or expected value that was used to determine the status score displayed in GUI 84.

Based on the known production rate of plant 30, a known amount of material needed to complete the surfacing operation (e.g., based on a predetermined design model), and a known amount of time available for completing the surfacing operation (e.g., entered by the supervisor), off-board computer 68 is configured to monitor the production rate of plant 30 and determine whether and to what extent the production rate of plant 30 is above, at, or below a production rate needed to sustain operations at worksite 10. When a difference between the production rate of plant 30 and the target production rate falls below a tolerable difference, off-board computer 68 updates the status score of plant 30 to indicate whether and to what extent plant 30 will be unable to meet the demand of the paving operation. Off-board computer 68 then updates first graphical objects 86 on GUI 84 to reflect any changes. As shown in FIG. 8, the first graphical object 86 associated with plant 30 is shown in GUI 142 to allow the supervisor to see the updated status score without having to return to GUI 84 (referring to FIG. 3), thereby allowing for a speedy assessment process.

GUI 142 includes a plant production rate object 146 configured to show the supervisor the production rate of plant 30 and may be indicative of whether and to what extent plant 30 will be able to satisfy the material demand at worksite 10. Off-board computer 68 also generates a map 148 on GUI 142 showing an area containing one or more plants 30 within a certain distance of worksite 10. When multiple plants 30 are shown on map 148, off-board computer 68 generates plant production rate object 146 for each plant 30 to allow the supervisor to visualize whether any other plants in the area can be relied on to make up for unfulfilled demand. As shown in FIG. 8, map 148 may be combined with map 124 (referring to FIG. 7).

In some embodiments, other information relating to plants 30 is also be provided via GUI 142. For example, other graphical objects are included to display a production temperature associated with each plant, a distance value from each plant to worksite 10, a maximum amount of paving material available, and/or other information. If a situation at plant 30 causes the production rate to drop or the production temperature of plant 30 falls below a minimum temperature needed to successfully transport material from plant 30 to worksite 10 before it cools (e.g., as determined by off-board computer 68 in conjunction with the known locations of plant 30 and worksite 10), off-board computer 68 regenerates the associated graphical object and/or update the status score of plant 30 and update first graphical object 86 (on GUI 84 and/or GUI 142) to reflect any changes.

It is also noted that any information generated by off-board computer 68 and shown to the supervisor on display device 66c can also or alternatively be similarly communicated and shown to the operator of any one or more of machines 12 (e.g., via display devices 66a, 66b), as desired, to help operators visualize more effectively control operational aspects of the surfacing operation.

In some embodiments, off-board computer 68 is a mobile device (e.g., as described above) configured to be used as part of a process management 65 tool for paving operations. That is, in some embodiments, off-board computer 68, including processor 67, memory 69, display device 71, communication device, and input devices 64c are collectively configured to be used by an operator (e.g., a manager, a foreman, a superintendent, a director, etc.) as a mobile process management tool 65 for observing, controlling, and facilitating paving operations. As a mobile device, off-board computer 68 can be carried by personnel to any jobsite and used to interact with any device or machines connected to control system 50 and/or be used to in a disconnected mode (i.e., disconnected from other devices and machines of control system 50).

Off-board computer 68 is configured to generate interactive computer objects, such as graphics (e.g., graphical objects) and GUIs, and/or receive inputs in conjunction with programs stored in memory 69 and executed via processor 67 (e.g., programs may be stored, which, when executed, are configured to generate graphical user interfaces, graphical objects, etc., and facilitate the receiving of inputs).

For example, in some embodiments, processor 67 is configured to generate a GUI 150 (e.g., on display device 71) as part of process management tool 65 (referring to FIG. 2). GUI 150 is configured to facilitate supervisory functions, such as monitoring and facilitating material transport processes between a first location and a second location. For instance, GUI 150 is configured to facilitate material transport between a plant (e.g., asphalt plant 30) and a worksite (e.g., worksite 10) and/or a particular machine on the worksite (e.g., paver 18).

As explained above, process management tool 65 includes a communication device 80c, configured to receive data messages, display device 71, input device(s) 64c, and processor 67, which is in communication with the other components. During a material transport process, a user may activate GUI 150 to observe certain process parameters and/or other information relating to a selected transport vehicle (e.g., selected via a graphical object 86 on GUI 84, referring to FIG. 3) or fleet of transport vehicles. Processor 67 is configured to generate GUI 150 on display device 71, including one or more graphical objects and/or graphical features.

For example, in some embodiments, processor 67 is configured to generate a map 152 indicative of a position of each of one or more transport vehicles 154 with respect to a first location 156 and a second location 158. As described above, first location 156 may be an asphalt production plant where fresh asphalt is produced for use in paving operations. In other embodiments, first location 156 may be a different type of material storage facility, such as a quarry, a mine, a manufacturing facility, a material storage facility, etc. Second location 158 may be a worksite or a machine on the worksite, such as a paver or other machine configured to consume, utilize, or process the material being delivered. It is to be appreciated that the use of the terms "first location" and "second location" are used in this description for purposes of convenience and clarity and are not intended to be limited. That is, in some embodiments, first and second locations 156, 158 may be different types of locations and may be associated with a different type of industrial, commercial, private, or other endeavor involving the transportation of material of any kind.

Map 152 is a graphical map configured to show the current locations of transport vehicles 154 with respect to one another and to first and second locations 156, 158. In some embodiments, map 152 is an interactive map configured to allow the user to zoom in or out (e.g., using input device(s) 64c) to change the area of view on the map. That is, the user is able to change the amount of area visible on map 152, allowing the user to see more or fewer transport vehicles 154 and/or other locations. In some embodiments, map 152 is associated with a commercially available GPS device or program and is configured to show other nearby traffic, roads, landmarks, and or other features.

In some embodiments, processor 67 is configured to generate one or more graphical objects configured to convey information relating to one or more transport vehicles shown on map 152. For example, in some embodiments, GUI 150 includes a truck ID object 160. Truck ID object 160 is a graphical object configured to display identifying information (e.g., a serial number, a unique ID number or alphanumeric label, a name, etc.) associated with a selected transport vehicle. In some embodiments, the selected transport vehicle may be chosen via a truck selection object 162. Truck selection object 162 is a graphical object configured to allow a user to select (e.g., via input device(s) 64*c*) one of the one or more transport vehicles 154. Truck selection object 162 may be, for example, a dropdown menu, a text box configured to receive a text entry input, or a button configured to generate another graphical object from which the user may select a transport vehicle from a list or other set of transport vehicle options.

As explained above, map 152 shows the current location of one or more of transport vehicles 154 with respect to first and second locations 156, 158. In this way, GUI 150 enables the user to visualize the relative spacing (e.g., in distance) between certain transport vehicles 154 or between transport vehicles and first or second location 156, 158. When the current locations of transport vehicles 154 are updated (e.g., periodically, in real time, etc.), the user is able to also ascertain a relative timing between certain transport vehicles 154 or between transport vehicles and first and second location 156, 158. In this way, a supervisor or transport vehicle operator is enabled to control or direct the control of one or more transport vehicle 154 to ensure proper spacing between vehicles during a road building process.

In some embodiments, processor 67 is configured to generate additional graphical objects on GUI 150 to convey more particular information relating to the spacing between transport vehicles 154. For example, in some embodiments, GUI 150 includes graphical objects indicative of the, relative distance, time, speed, and/or other parameters relating to a first transport vehicle 164, a second transport vehicle 166 and/or a third transport vehicle 168. In some embodiments, first transport vehicle 164 is the selected transport vehicle, as discussed above. First transport vehicle 164 may be a transport vehicle of interest to a supervisor or the transport vehicle which a driver is currently operating. Second transport vehicle 166 and third transport vehicle are others of transport vehicles 154 shown on map 152. In some instances, second and third transport vehicles 166, 168 are the closest transport vehicles (e.g., in front of and/or behind) first transport vehicle 164. It is noted that first, second, and third transport vehicles 164, 166, 168 are discussed here for exemplary purposes only, and in other embodiments there may be graphical objects relating to more or fewer transport vehicles. Additionally, the respective positioning of second and third transport vehicles 166, 168 with respect to first transport vehicle 164 may vary over time, and therefore are not limited to any particular position.

In some embodiments, GUI 150 includes one or more graphical objects 170 indicative of a spacing between first transport vehicle 164 and second transport vehicle 166. In some embodiments, graphical objects 170 includes a truck ID object 172, position object 174, distance object 176, speed object 178, separation time object 180, and/or estimated time of arrival (ETA) object 182. Truck ID object 172 is indicative of identifying information (e.g., ID number, name, serial number, alphanumeric string of characters, etc.) associated with second transport vehicle 166. Position object 174 is configured to indicate the relative position of second transport vehicle 166 with respect to first transport vehicle 164. For example, position object may indicate whether second transport vehicle is "closest ahead" (i.e., the closest vehicle ahead) of first transport vehicle 164, closest behind, second position ahead or behind, third position ahead or behind, etc. Distance object 176 is indicative of a separation distance between first and second transport vehicles 164, 166. Distance object 176 may be configured to indicate the separation distance (e.g., determined by processor 67 based on GPS locations, a dedicated GPS device or program, etc.) in any desired unit, such as feet, miles, yards, meters, kilometers, etc. In this way, objects 172, 174, and 176 enable the user to quickly and easily understand which transport vehicle is on map 152, where it is located relative to first transport vehicle 164, and how far away it is. A supervisory or truck operator can use this information to quickly determine whether a distance spacing between first transport vehicle 164 and another vehicle is permissible or whether it should be adjusted.

Speed object 178 is indicative of a speed of second transport vehicle 166. Speed object 178 may embody any style of speed indicator, such as a speedometer, a numeric speed indicator, a sliding bar, a color coded object, etc. In some embodiments, speed object is indicative of a relative speed of second transport vehicle 166 with respect to first transport vehicle 164. For example, in some embodiments, speed object 178 includes features, such as colors, numbers, patterns, etc., indicative of whether and to what extent second transport vehicle 166 is traveling faster, slower, or within an acceptable speed difference of first transport vehicle 164. In this way, speed object 178 enables a supervisor or truck operator to quickly and easily understand how quickly another transport vehicle is moving and/or whether and to what extent that other truck is moving faster or slower than first truck 164. In other embodiments, speed object 178 may be replaced with a different object indicative of a different parameter, such as a payload parameter (e.g., total payload, percent payload remaining, etc.), number of stops in the travel route (e.g., number of stops remaining, number of stops reached, etc.), and/or other information.

Separation time object 180 is indicative of a time spacing between first and second transport vehicles 164, 166. That is, separation time object 180 is indicative of how much time separates first and second transport vehicles 164, 166 at their current speeds—i.e., how much time until first or second transport vehicle 164, 166 reaches the other. In some embodiments, separation time object 180 is configured to indicate when the separation time is above or below a certain threshold. For example, separation time object may be configured to change colors, become highlighted, start flashing, etc., when the separation time exceeds a threshold or falls below a threshold. In this way, separation time object 180 enables a supervisor or truck operator to quickly and easily ascertain how must time remains (e.g., speed of first transport vehicle 164) until first transport vehicle 164 reaches second transport vehicle 166.

ETA object 182 is indicative of how much time is left until second transport vehicle 166 reaches a destination, such as first location 156 or second location 158. For example, ETA object 182 may indicate the ETA of second transport vehicle in minutes, hours, seconds, and/or other time units. In some embodiments, ETA object 182 is configured to indicate when the ETA is above or below a certain threshold. For example, ETA object 182 may be configured to change colors, become highlighted, start flashing, etc., when the ETA exceeds a threshold or falls below a threshold. In this way, ETA object 182 enables a supervisor or truck operator to quickly and easily ascertain how must time remains until second transport vehicle 166 reaches its destination.

Graphical objects 170 enable a user (e.g., a supervisor or truck operator) to quickly and easily ascertain the location, relative speed, and relative distance of other transport vehicles on map 152 with respect to first transport vehicle 164. This enables users to understand how to adjust the speed of first transport vehicle 164 relative to the other transport vehicles to ensure proper vehicle spacing and optimum delivery timing of material to worksite 10. That is, users can observe and/or control transport vehicles 154 using the information determined through graphical object 170 to improve timing and spacing of material deliveries to worksite 10 in order to optimize workflow and material utilization.

Figure 9:
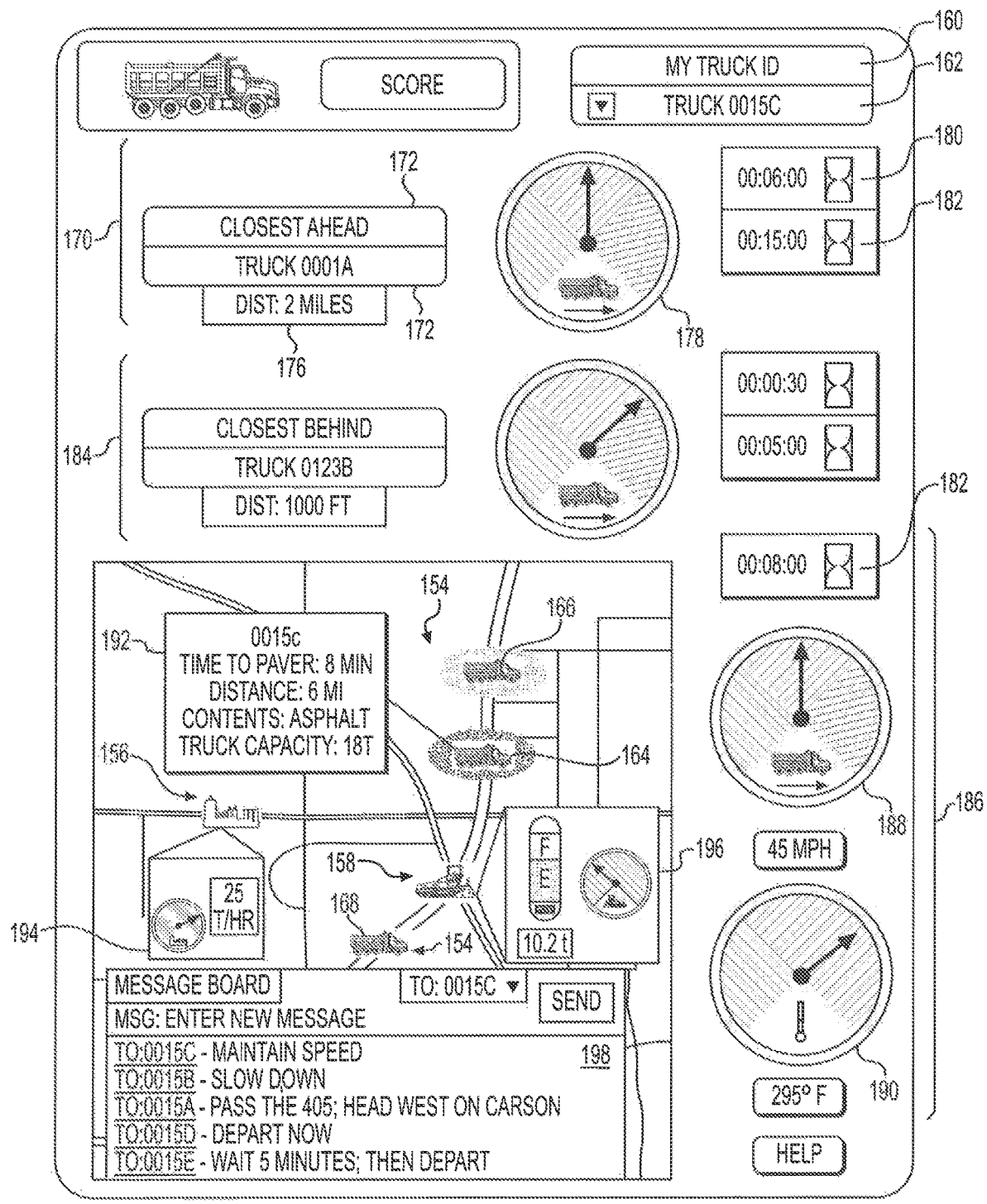
FIGS. 9 and 10 are pictorial illustrations of exemplary disclosed graphical user interfaces associated with an exemplary disclosed process management tool that may be generated by the control system of FIG. 2.

In some embodiments, GUI 150 includes graphical objects 184 indicative of a spacing between first transport vehicle 164 and third transport vehicle 168. As shown in FIG. 9, graphical objects 184 are the same types of graphical objects as graphical objects 170, and therefore will not be discussed in detail. It is understood that other graphical objects indicative of a spacing between first transport vehicle 164 and other transport vehicles may be included, which may be the same or different than graphical objects 170.

GUI 150 also includes graphical objects 186 indicative of parameters associated with first transport vehicle 164. Graphical objects 186 include a speed object 188 indicative of a speed of first transport vehicle 164. Speed object 188 may embody any style of speed indicator, such as a speedometer, a numeric speed indicator, a sliding bar, a color coded object, etc. In some embodiments, speed object 188 is indicative of a relative speed of first transport vehicle 164 with respect to another transport vehicle 154. In other embodiments, speed object 188 is indicative of whether and to what extent first transport vehicle 164 will or will not arrive at a destination (e.g., first or second location 156, 158) at a target time of arrival. For example, in some embodiments, speed object 188 includes features, such as colors, numbers, patterns, etc., indicative of whether and to what extent first transport vehicle 164 is traveling faster, slower, or within an acceptable speed range that will enable first transport vehicle 164 to arrive at its destination on time. In this way, speed object 188 enables a supervisor or truck operator to quickly and easily understand how quickly first transport vehicle 164 is moving and/or whether and to what extent first transport vehicle 164 is travelling faster or slower than planned or desired. In this way, speed object 188 enables a supervisor or operator to understand how to control or direct the control of first transport vehicle 164 to ensure a timely arrival.

In some embodiments, graphical objects 186 also include a temperature object 190 indicative of a temperature associated with first transport vehicle 164. For example, temperature object 190 may be indicative of the temperature of asphalt or other material being transported by first transport vehicle. Temperature object 190 enables a user to quickly and easily understand the temperature of the material being transported in conjunction with the positional, speed, and spacing information indicated by GUI 150. In this way, users are able to determine whether any process parameters (e.g., the speed of first transport vehicle 164 and/or other transport vehicles) should be adjusted to avoid the transported material from cooling to an extent where it cannot be used in the paving process. In some embodiments, temperature object 190 is configured to indicate whether and/or to what extent the temperature of the transported material is above a threshold, below a threshold, or within a suitable range. For example, temperature object 190 may include colors, numbers, patterns, etc., indicative of whether or to what extent the temperature is above or below a threshold.

In some embodiments, graphical objects 186 also includes an ETA object 191. ETA object 191 is indicative of how much time is left until first transport vehicle 164 reaches a destination, such as first location 156 or second location 158. For example, ETA object 191 may indicate the ETA of first transport vehicle in minutes, hours, seconds, and/or other time units. In some embodiments, ETA object 191 is configured to indicate when the ETA is above or below a certain threshold. For example, ETA object 191 may be configured to change colors, become highlighted, start flashing, etc., when the ETA exceeds a threshold or falls below a threshold. In this way, ETA object 191 enables a supervisor or truck operator to quickly and easily ascertain how must time remains until first transport vehicle 164 reaches its destination.

In some embodiments, GUI 150 includes a vehicle information object 192 configured to display information relating to one of the transport vehicles 154. In some embodiments, vehicle information object 192 is generated in response to a user selection of one of transport vehicles on map 152 (e.g., via input device(s) 64c). In some embodiments, vehicle information object 192 is an information overlay positioned on top of map 152. In other embodiments, vehicle information object is a separate window, table, or other graphical object displayed on display device 71. Vehicle information object 192 includes information associated with the selected transport vehicle (i.e., the transport vehicle selected via map 152), such as, but not limited to vehicle ID information, distance information (e.g., to or from a location or destination), time information (e.g., time to a location, destination, or to another vehicle), content or payload information (e.g., asphalt information), and vehicle specification information (e.g., model type, size, payload capacity, weight rating, etc.). Vehicle information object 192 enables users to quickly check certain information relating to vehicles on map 152, which enables a quicker understanding of each vehicle's status without requiring individual specific contact with each vehicle.

In some embodiments, GUI 150 includes one or more process parameter objects 194 and 196 indicative of a process parameter associated with the material, such as at the first or second location 156, 158. For example, process parameter object 194 may be a plant parameter object 194. Plant parameter object 194 is indicative of material parameters associated with a plant, such as material production rate (e.g., asphalt production rate), a yield amount (hourly, daily, weekly, monthly, etc.), staged material amount (i.e., ready for pickup), type of material mixture (e.g., asphalt content details), production temperature, and/or other information. Process parameter object 196 is a paver parameter object 196. Paver parameter object 196 is indicative of material parameters associated with a paver, such as material temperature (e.g., in the hopper, on the conveyor, etc.), material quantity (e.g., in the hopper, on the conveyor, etc.), material type (e.g., asphalt mixture details), ticket number (e.g., batch number), paver production rate (e.g., material consumption or usage rate by weight or volume), and/or other information. Process parameter objects 194 and 196 enable a user to visualize and understand the state of the material at different points in the process while simultaneously observing material transport process parameters. In this way, users are able to more thoroughly and easily understand how to control or direct the control of transport vehicles 154 to ensure paving processes are sufficiently stocked with material at suitable times with suitable temperatures.

In some embodiments, GUI 150 is configured to receive a user input indicative of a personal message. For example, in some embodiments, GUI 150 includes a message object 198 configured to receive a user input (e.g., via input device(s) 64c) indicative of a personal message. Message object 198 may include message entry features, such as, but not limited to, text boxes configured to receive a custom message, a dropdown menu of preselected messages, message symbols (e.g., graphical symbols), and/or other types of message features. In some embodiments, message object 198 is configured to receive an input indicative of a transport vehicle intended to receive a particular message. For example, the user may type or otherwise enter the intended recipient into a text box or message box, select the intended recipient (e.g., transport vehicle) from map 152 (e.g., via input device(s) 64c), or select a recipient from a dropdown menu). It is understood that other selection techniques are possible. Communication object 198 enables users to craft and send desired messages to one or more transport vehicle to accomplish any type of communicative goal, such as ask a question, provide instructions, share relevant information, and or other goals. In this way, supervisors and operators are able to better communicate with other transport vehicles while also observing operational activities, thereby improving the speed, clarity, and frequency with which relevant messages can be sent.

Processor 67 is configured to communicate the personal message via communication device 80c. For example, in some embodiments, message object 198 includes a graphical object or other feature configured to send or confirm an intention to send a message input via message object 198. The message is then communicated to the intended transport vehicle and/or other transport vehicles via a communication network, such as control system 50 (referring to FIG. 2).

Figure 10:
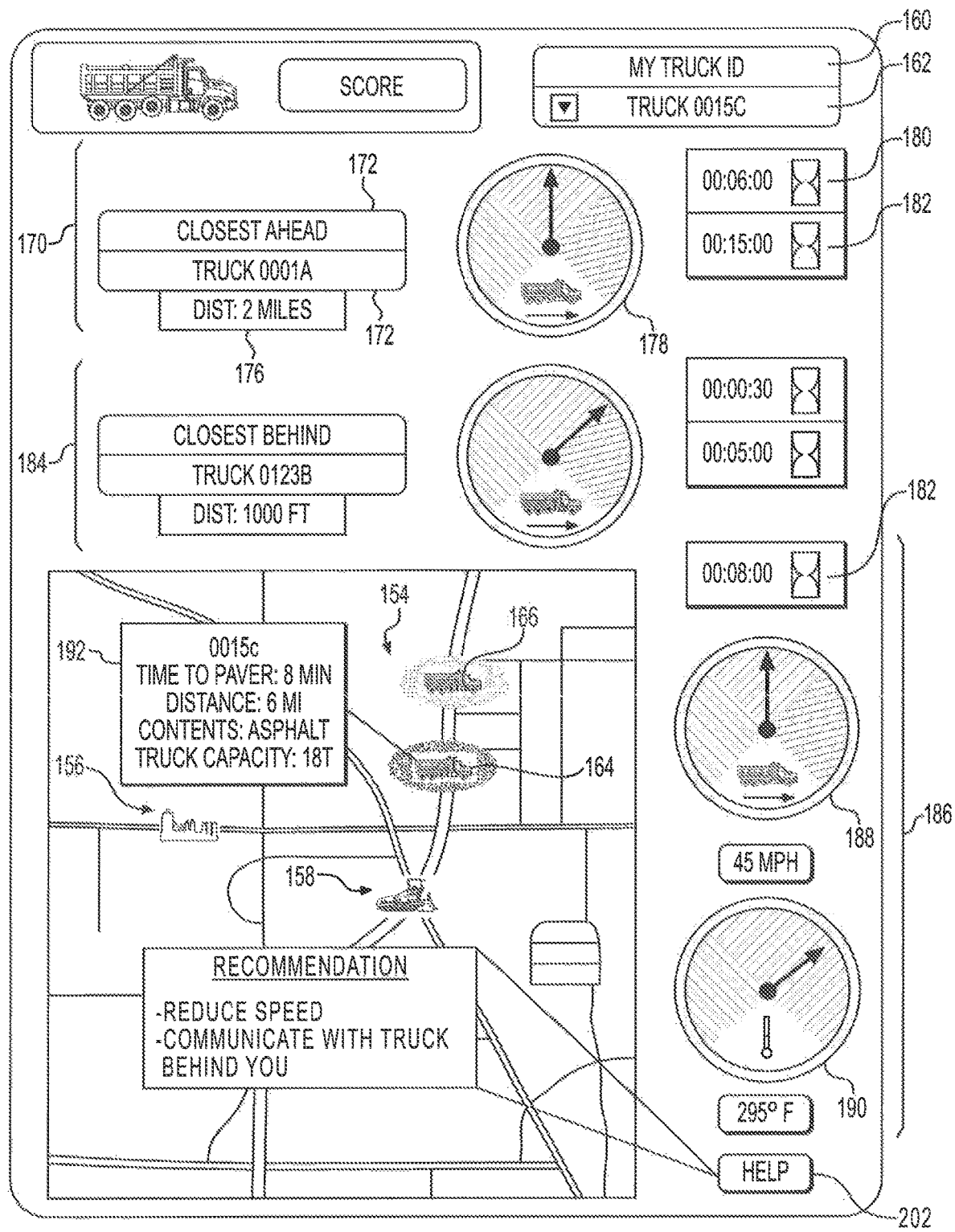

In some embodiments, with reference to FIG. 10, GUI 150 includes command object 200 configured to display a message indicative of an operational command. Command object 200 is a graphical object, such as a dialog box overlay positioned on top of map 152. In other embodiments, command object 200 is a separate window, table, or other graphical object displayed on display device 71. The operational command displayed by command object 200 may include textual messages, symbolic messages (e.g., including meaningful symbols or characters), pictorial messages, and or other types of messages. The message may be indicative of a command received via control system 50, such as a message generated using message object 198 from a different electronic device. Command object enables a user to be prompted with a command, which can be carried out while viewing the progress of their actions via GUI 150.

In some embodiments, GUI 150 includes a recommendation object 202, such as a "help button" or similar type of selectable graphical object. Upon selection of recommendation object 202, processor 67 generates command object 200 and populates command object 200 with a message. The message populated into command object may be indicative of a suggested procedure or course of action, a suggestion to contact other personnel, a recommended parameter setting (e.g., speed, separation distance, separation time, etc.), an alert (e.g., traffic alert, process parameter alert, etc.), or another type of message. Recommendation and suggestion messages may be generated by processor 67 or by another computational device associated with control system 50 and communicable thereby. For example, in some embodiments, a computational device within control system 50 is configured to analyze process parameters from machines 12 and plant 30, a traffic analysis system, and or other data sources, and determine (e.g., based on an algorithm or computational program) process recommendations to optimize the paving process. Such recommendations may include suggestions to slow down, speed up, wait at a plant, wait at a worksite, proceed in a certain amount of time (e.g., 1 minute, 5 minutes, 30 minutes, etc.), in order to ensure proper spacing between transport vehicles.

For example, during a material transport operation, it is often the role of a supervisor or foreman to coordinate adjustments to the transport process in order to accommodate process variation. A supervisor may instruct certain transport vehicles to pursue certain travel routes, wait for certain periods of time, utilize speed ranges within legal parameters, and or follow other commands to ensure a desired flow of material into the worksite at a proper temperature for use by the paver. Such determinations may be made by personnel or by a computer and communicated to process management tool 65 and displayed via command object 200 in response to being sent by the originating personnel or computer or upon selection of recommendation object 202 by the user (e.g., via input device(s) 64c). Command object 200 and recommendation object 202 enable users to receive and request command, tips, hints, or recommendations for controlling or directing control of transport vehicles 154 to ensure proper spacing among transport vehicles and a steady flow of material to worksite 10.

Several advantages are associated with the disclosed control system. For example, because control system 50 may help supervisors to coordinate the operations of each of machines 12 by aggregating information from several data sources into a single control resource, supervisors are able to quickly and easily address several operational issues from any location where a communication signal can be maintained. Further, because data from a plurality of sources is aggregated into a single control device, supervisors are able to quickly obtain multiple pieces of relevant information without relying on other personnel or having to search through a plurality of data resources. Additionally, because control system 50 provides for the generation of GUIs that include qualitative indicia of operational aspects, supervisors are able to quickly and easily identify and understand situations needing corrective action as they are occurring, thereby allowing for the possibility of a fast and accurate on-the-spot assessment and resolution. Because supervisors are able to simulate or actually command changes to the operations of machines 12, effective solutions can be reached using iterative adjustments and observations.

It will be apparent to those skilled in the art that various modifications and variations can be made to the disclosed control system without departing from the scope of the disclosure. Other embodiments of the control system will be apparent to those skilled in the art from consideration of the specification and practice of the control system disclosed herein. It is intended that the specification and examples be considered as exemplary only, with a true scope of the disclosure being indicated by the following claims and their equivalents.

What is claimed is:

1. A process management tool for managing transport of an asphalt material between a first location and a second location, comprising:

a communication device configured to receive data messages;
a display device;
an input device configured to receive user inputs; and
a processor in communication with the communication device, the display device, and the input device, wherein the processor is configured to:
generate a graphical user interface on the display device, the graphical user interface including:
a map indicative of a position of each of a plurality of work trucks with respect to the first location and the second location,
a first graphical object indicative of a spacing between at least a first work truck and a second work truck of the plurality of work trucks,
a command object to notify an operator of at least one of the first work truck and the second work truck to perform a task in order to adjust a spacing between the first work truck and the second work truck to ensure a proper spacing between the first work truck and the second work truck given road conditions and a process parameter associated with the asphalt material at the first location and/or the second location, and
a paver production object that provides an indication to adjust operation of a paver to raise or lower a groundspeed of the paver given a production rate of the asphalt material from the first location, the process parameter associated with the asphalt material, and the adjusted spacing between at least the first work truck and the second work truck.

2. The process management tool of claim 1, wherein the process parameter associated with the asphalt material includes at least one of a production temperature associated with the asphalt material at the first location and a worksite temperature associated with the asphalt material in one of a hopper of the paver or as a work surface created by the paver at the second location.

3. The process management tool of claim 2, wherein the processor is configured to, based on if the production temperature of the asphalt material at the first location falls below a minimum temperature needed to successfully transport the asphalt material from the first location to the second location before the asphalt material cools below a minimum temperature, regenerate a second graphical object indicative of the process parameter associated with the asphalt material.

4. The process management tool of claim 1, wherein the first location is an asphalt plant and the second location is an asphalt paving worksite.

5. The process management tool of claim 1, wherein the first graphical object is configured to indicate the spacing between the first work truck and the second work truck as a time or a distance.

6. The process management tool of claim 1, wherein the process parameter associated with the asphalt material is further associated with the first location and/or the second location.

7. The process management tool of claim 1, wherein the process parameter associated with the asphalt material is a production rate of the asphalt material and/or a consumption rate of the asphalt material.

8. The process management tool of claim 1, wherein the graphical user interface is configured to receive a user input via the input device, the user input being indicative of a selected working truck from among the plurality of working trucks.

9. The process management tool of claim 8, wherein the process parameter associated with the asphalt material is further associated with the selected working truck.

10. The process management tool of claim 8, wherein the process parameter associated with the asphalt material is a temperature of the asphalt material in the selected working truck.

11. The process management tool of claim 1, wherein the graphical user interface includes a third graphical object configured to display a message indicative of an operational command.

12. A method of providing a process management tool having a display device for managing transport of a hauling material between a plant and a worksite, the method comprising:
generating a graphical user interface on the display device;
displaying a map on the graphical user interface, the map being indicative of a position of each of one or more transport vehicles with respect to the plant and the worksite;
displaying a first graphical object on the graphical user interface, the first graphical object being indicative of a spacing between a first transport vehicle and a second transport vehicle of the one or more transport vehicles;
displaying a second graphical object on the graphical user interface, the second graphical object being indicative of a process parameter associated with the hauling material at the plant and the worksite, wherein the process parameter associated with the material includes a production temperature associated with the hauling material at the plant and a worksite temperature associated with the hauling material at the worksite;
regenerating the second graphical object when the production temperature of the hauling material at the plant falls below a minimum temperature needed to successfully transport the hauling material from the plant to the worksite before the hauling material cools below a minimum temperature;
determining a proper spacing between the first transport vehicle and the second transport vehicle based on traffic conditions and the process parameter associated with the hauling material at the plant and at the worksite; and
displaying a command object to notify an operator of each of the first transport vehicle and the second transport vehicle to perform a respective task to ensure the proper spacing between the first transport vehicle and the second transport vehicle based on traffic conditions and the process parameter associated with the hauling material at the plant and at the worksite.

13. The method of claim 12, further comprising displaying a paver production object that provides an indication to adjust operation of a paver at the worksite to raise or lower a groundspeed of the paver based on a production rate of the hauling material at the plant, the process parameter associated with the hauling material, and the spacing between the first transport vehicle and the second transport vehicle.

14. The method of claim 12, wherein the first graphical object is configured to indicate the spacing between the first transport vehicle and the second transport vehicle as a time or a distance.

15. The method of claim 12, wherein the process parameter associated with the hauling material is further associated with the plant and/or the worksite.

16. The method of claim 12, wherein the process parameter associated with the hauling material is a material production rate and/or a material consumption rate.

17. A process management tool for managing transport of an asphalt material between an asphalt plant and an asphalt paving worksite, comprising:
- a communication device configured to receive messages;
- a display device;
- an input device configured to receive user inputs; and
- a processor in communication with the communication device, the display device, and the input device, wherein the processor is configured to:
  - generate a graphical user interface on the display device, the graphical user interface including:
    - a map indicative of a position of each of one or more transport vehicles with respect to the asphalt plant and the asphalt paving worksite,
    - a first graphical object indicative of a spacing between a first transport vehicle and a second transport vehicle as a time or a distance,
    - a second graphical object indicative of a process parameter at the asphalt plant, wherein the process parameter includes one or more of a material production rate and a material production temperature of asphalt produced at the asphalt plant, and wherein the processor is configured to, based on a drop in the material production rate or material production temperature at the asphalt plant below a predetermined threshold, regenerate the second graphical object and update the first graphical object,
    - a paver production object that provides an indication to adjust operation of a paver at the asphalt paving worksite to raise or lower a groundspeed of the paver based on the process parameter at the asphalt plant, the regenerated second graphical object, and the spacing between the first transport vehicle and the second transport vehicle.

18. The process management tool of claim 17, wherein the processor is an off-board processor and the graphical user interface further includes a third graphical object indicative of an operating parameter of the first transport vehicle and/or the second transport vehicle.

19. The process management tool of claim 17, wherein the graphical user interface further includes a command object to notify an operator of the first transport vehicle and/or the second transport vehicle to perform a task to maintain a suitable spacing between the first transport vehicle and the second transport vehicle based on the process parameter at the asphalt plant and/or driving characteristics between the asphalt paving plant and the asphalt paving worksite.

20. The process management tool of claim 17, wherein the process parameter associated with the asphalt material is a production rate of the asphalt material and/or a consumption rate of the asphalt material.

* * * * *